United States Patent
Hamaya et al.

(10) Patent No.: US 12,521,876 B2
(45) Date of Patent: Jan. 13, 2026

(54) ROBOT MODEL LEARNING DEVICE, ROBOT MODEL MACHINE LEARNING METHOD, RECORDING MEDIUM STORING ROBOT MODEL MACHINE LEARNING PROGRAM, ROBOT CONTROL DEVICE, ROBOT CONTROL METHOD, AND RECORDING MEDIUM STORING ROBOT CONTROL PROGRAM

(71) Applicant: OMRON Corporation, Kyoto (JP)

(72) Inventors: Masashi Hamaya, Tokyo (JP); Kazutoshi Tanaka, Tokyo (JP)

(73) Assignee: OMRON Corporation, Kyoto (JP)

( * ) Notice: Subject to any disclaimer, the term of this patent is extended or adjusted under 35 U.S.C. 154(b) by 217 days.

(21) Appl. No.: 18/274,206

(22) PCT Filed: Feb. 1, 2022

(86) PCT No.: PCT/JP2022/003877
§ 371 (c)(1),
(2) Date: Jul. 25, 2023

(87) PCT Pub. No.: WO2022/172812
PCT Pub. Date: Aug. 18, 2022

(65) Prior Publication Data
US 2024/0083023 A1  Mar. 14, 2024

(30) Foreign Application Priority Data

Feb. 10, 2021 (JP) ................ 2021-020049

(51) Int. Cl.
*B25J 9/16* (2006.01)
*G05B 13/02* (2006.01)

(52) U.S. Cl.
CPC ............. *B25J 9/163* (2013.01); *B25J 9/1633* (2013.01); *G05B 13/0265* (2013.01)

(58) Field of Classification Search
CPC ...... B25J 9/163; B25J 9/1633; G05B 13/0265
See application file for complete search history.

(56) References Cited

U.S. PATENT DOCUMENTS

| | | | |
|---|---|---|---|
| 2017/0028553 A1 | 2/2017 | Tsuda et al. | |
| 2018/0222046 A1 | 8/2018 | Gotou | |
| 2018/0361576 A1* | 12/2018 | Sakai | B25J 9/1694 |
| 2018/0370027 A1 | 12/2018 | Oota et al. | |

(Continued)

FOREIGN PATENT DOCUMENTS

| | | |
|---|---|---|
| JP | 2017-030137 A | 2/2017 |
| JP | 2017030135 A | 2/2017 |

(Continued)

OTHER PUBLICATIONS

International Search Report issued in corresponding International Application No. PCT/JP2022/003877 dated Apr. 5, 2022.

(Continued)

*Primary Examiner* — Dylan M Katz
(74) *Attorney, Agent, or Firm* — Morgan, Lewis & Bockius LLP

(57) ABSTRACT

A non-transitory recording medium storing a robot control device acquires an actual value of a position and a posture of a robot and an actual value of an external force applied to the robot, executes a robot model including a state transition model that, based on the actual value of the position and the posture at a certain time and an action command that can be given to the robot, calculates a predicted value of the position and the posture of the robot, and an external force model that calculates a predicted value of an external force applied to the robot, calculates a reward based on an error of the position and the posture and the predicted value of the external force, generates and gives a plurality of candidates for the action command to the robot model for each control cycle.

18 Claims, 18 Drawing Sheets

(56) References Cited

U.S. PATENT DOCUMENTS

| | | | |
|---|---|---|---|
| 2019/0224844 A1 | 7/2019 | Tsuda et al. | |
| 2019/0232488 A1* | 8/2019 | Levine | G05B 13/027 |
| 2020/0023520 A1 | 1/2020 | Yoshizumi | |
| 2020/0101603 A1 | 4/2020 | Satou | |
| 2021/0001482 A1 | 1/2021 | Tsuda et al. | |

FOREIGN PATENT DOCUMENTS

| | | |
|---|---|---|
| JP | 2018-126802 A | 8/2018 |
| JP | 6458912 B1 | 1/2019 |
| JP | 2020-055095 A | 4/2020 |

OTHER PUBLICATIONS

Written Opinion issued in corresponding International Application No. PCT/JP2022/003877 dated Apr. 5, 2022.

Beltran-Hernandez et al., "Variable Compliance Control for Robotic Peg-in-Hole Assembly: A Deep-Reinforcement-Learning Approach", Cornell University Library, Nov. 2020, pp. 1-17.

Benallegue et al., "Model-Based External Force/Moment Estimation For Humanoid Robots With No Torque Measurement", IEEE International Conference on Robotics and Automation (ICRA), 2018, pp. 3122-3129.

Krogh, "Active safety in collaborative robots", Aalborg University, Electronic & IT: Control & Automation, Group: CAI0-1031, Jun. 7, 2018, pp. 1-89.

Yoon et al., "Robot Learning in Mixed Adversarial and Collaborative Settings", IEEE/RSJ International Conference on Intelligent Robots and Systems (IROS), 2020, pp. 9329-9336.

Extended European Search Report issued in European Patent Application No. 227526407, dated Jan. 3, 2025.

Office Action issued in corresponding Chinese Patent Application No. 202280012144.1, dated Jun. 28, 2025.

* cited by examiner

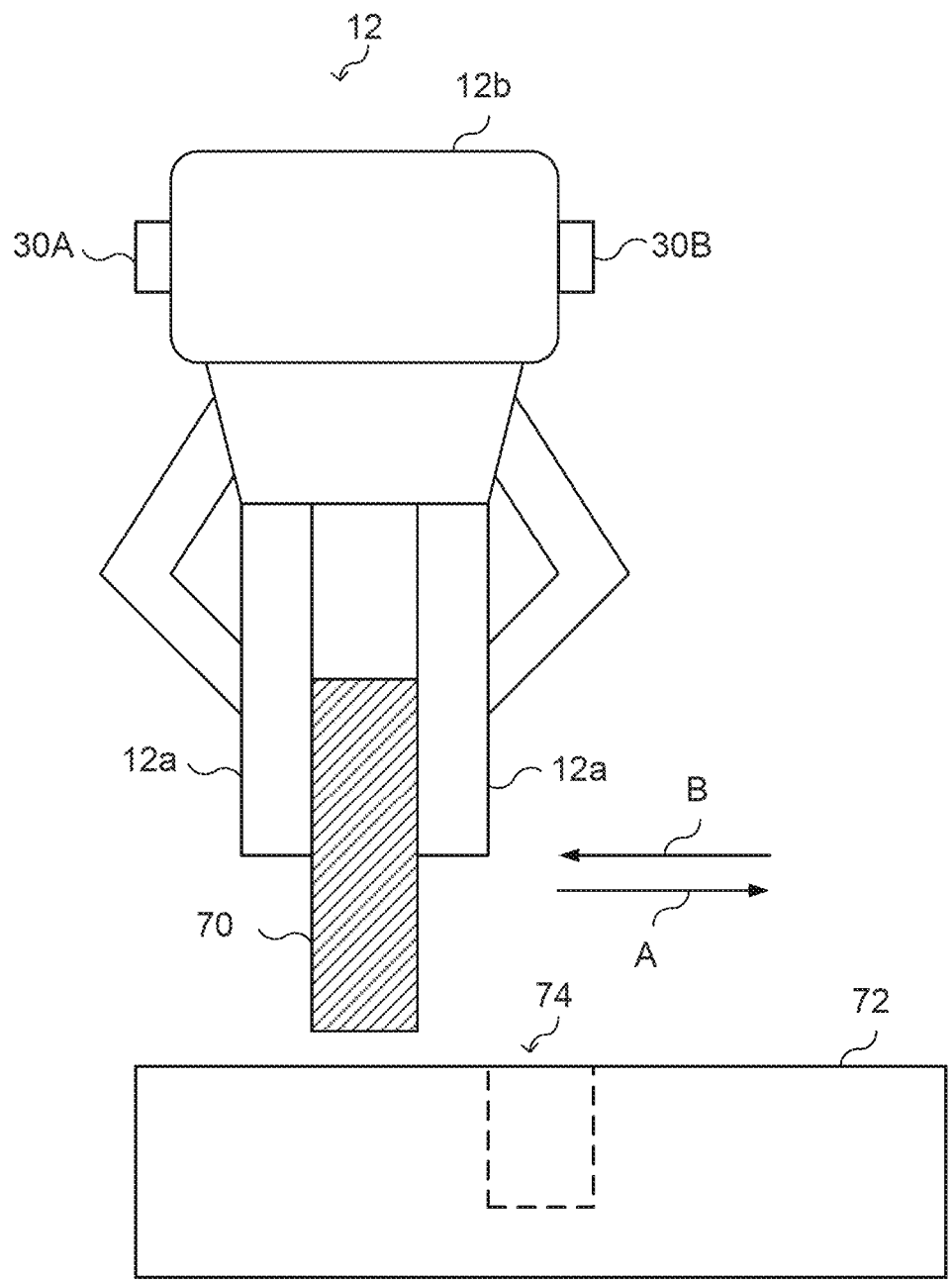

[Fig. 12]
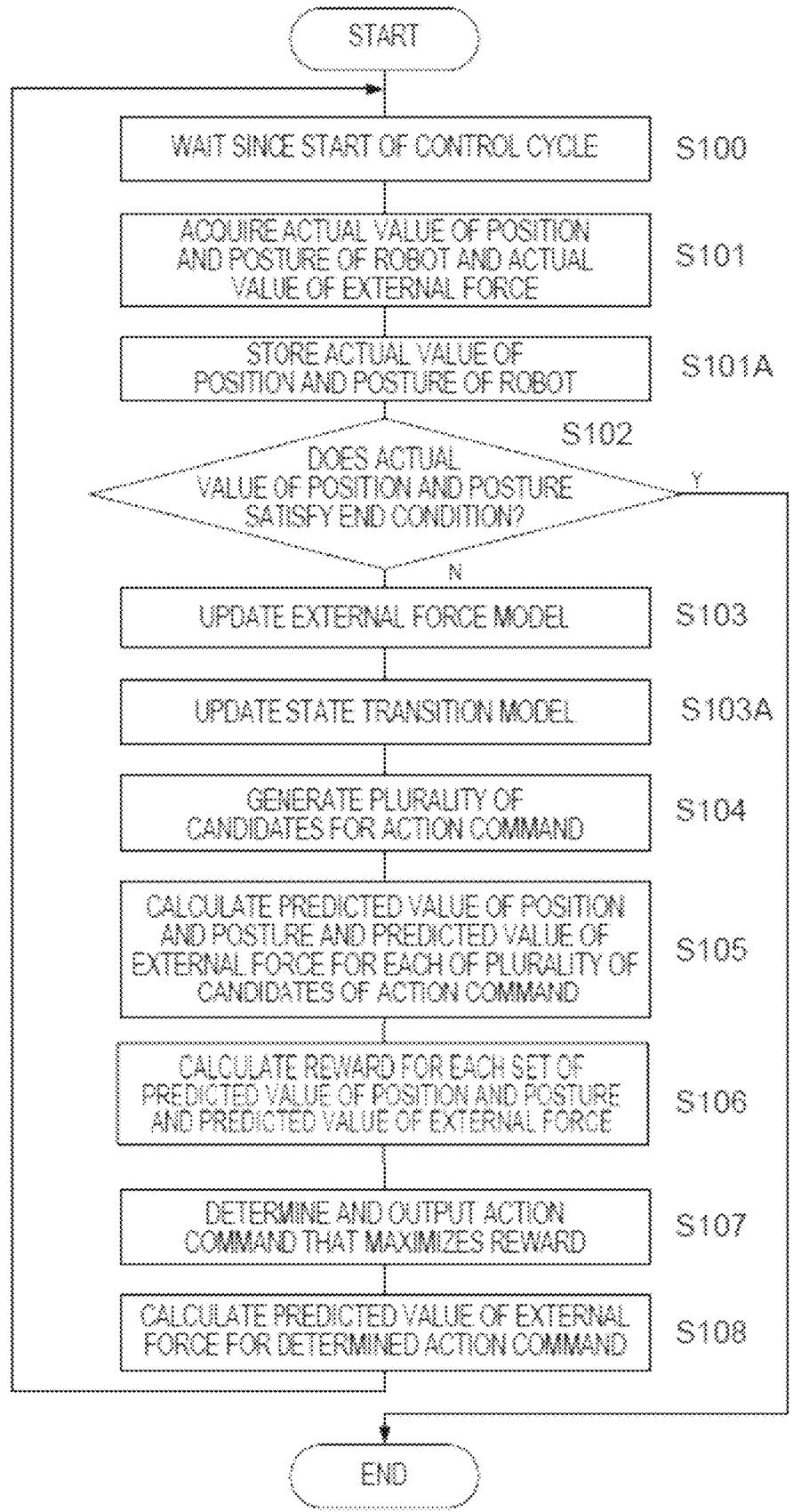

LEARNING CURVE

NUMBER OF SUCCESSES IN UNKNOWN ENVIRONMENT

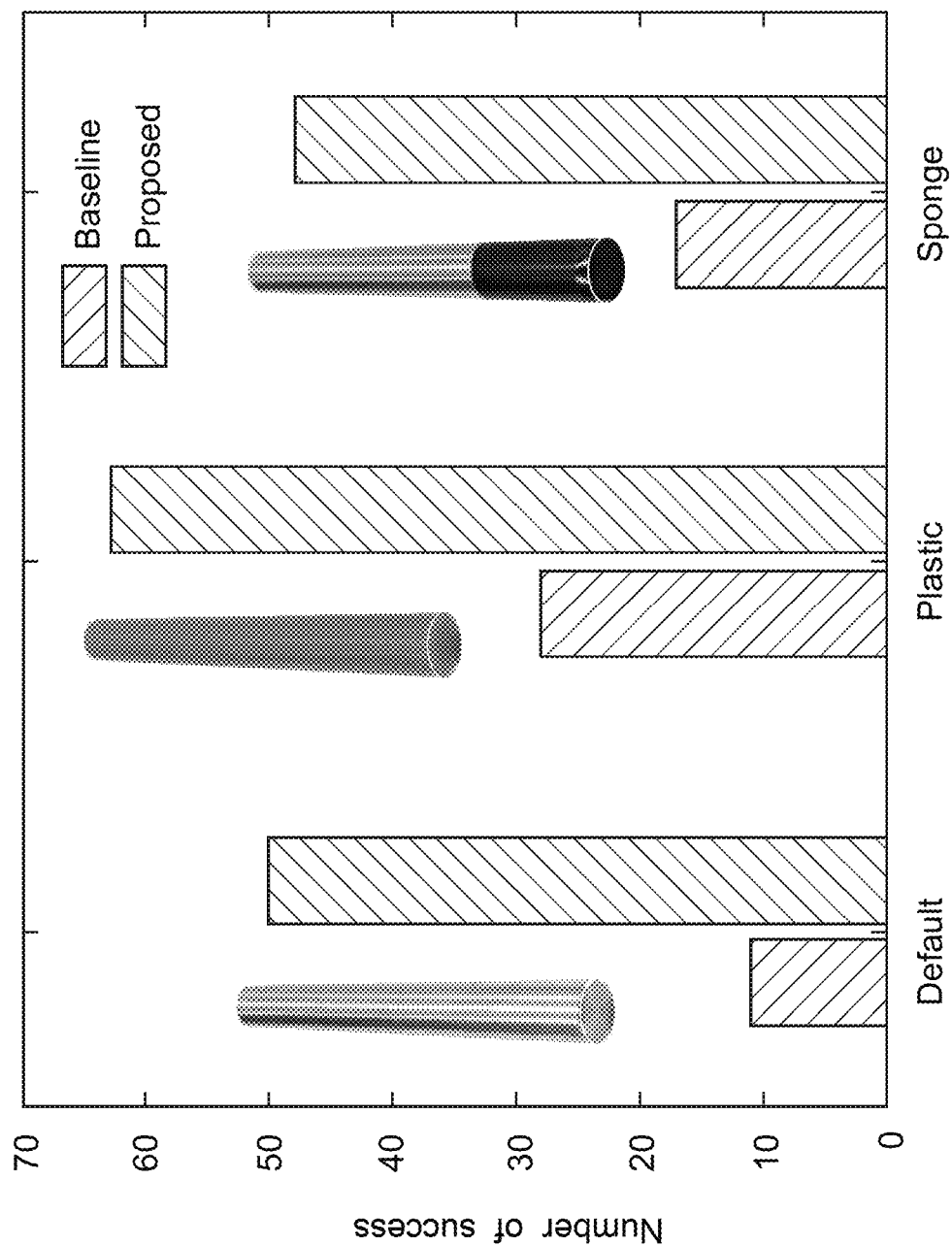

ROBOT MODEL LEARNING DEVICE, ROBOT MODEL MACHINE LEARNING METHOD, RECORDING MEDIUM STORING ROBOT MODEL MACHINE LEARNING PROGRAM, ROBOT CONTROL DEVICE, ROBOT CONTROL METHOD, AND RECORDING MEDIUM STORING ROBOT CONTROL PROGRAM

TECHNICAL FIELD

The disclosed technology relates to a robot model learning device, a robot model machine learning method, a robot model machine learning program, a robot control device, a robot control method, and a robot control program.

BACKGROUND ART

In order for a robot to automatically acquire a control law necessary to achieve a work, learning of a robot model by machine learning is performed.

For example, Japanese Patent Application Laid-Open (JP-A) No. 2020-055095 discloses a technology of a control device that controls an industrial robot having a function of detecting a force and a moment applied to a manipulator, the control device including: a control unit that controls the industrial robot on the basis of a control command; a data acquisition unit that acquires at least one of the force and the moment applied to the manipulator of the industrial robot as acquired data; and a preprocessing unit that generates, on the basis of the acquired data, force state data including information regarding the force applied to the manipulator and control command adjustment data indicating an adjustment action of the control command related to the manipulator as state data, and executes processing of machine learning related to the adjustment action of the control command related to the manipulator on the basis of the state data.

SUMMARY OF INVENTION

Technical Problem

However, it is difficult to set parameters and design a reward function when learning a robot model by machine learning, and it is difficult to efficiently learn.

The disclosed technology has been made in view of the above points, and an object thereof is to provide a robot model learning device, a robot model machine learning method, a robot model machine learning program, a robot control device, a robot control method, and a robot control program capable of efficiently learning a robot model when the robot model is learned by machine learning.

Solution to Problem

A first aspect of the disclosure is a robot model learning device including: an acquisition unit that acquires an actual value of a position and a posture of a robot and an actual value of an external force applied to the robot; a robot model including a state transition model that, based on the actual value of the position and the posture at a certain time and an action command that can be given to the robot, calculates a predicted value of the position and the posture of the robot at a next time, and an external force model that calculates a predicted value of an external force applied to the robot; a model execution unit that executes the robot model; a reward calculation unit that calculates a reward based on an error between the predicted value of the position and the posture and a target value of a position and a posture to be reached, and the predicted value of the external force; an action determination unit that generates and gives a plurality of candidates for the action command to the robot model for each control cycle, and based on a reward calculated by the reward calculation unit corresponding to each of the plurality of candidates for the action command, determines an action command that maximizes a reward; and an external force model update unit that updates the external force model so as to reduce a difference between the predicted value of the external force calculated by the external force model based on the determined action command and the actual value of the external force corresponding to the predicted value of the external force.

In the first aspect, a state transition model update unit that updates the state transition model so as to reduce an error between the predicted value of the position and the posture calculated by the state transition model based on the determined action command and the actual value of the position and the posture corresponding to the predicted value of the position and the posture may be included.

In the first aspect, in a case where the external force is a modified external force that is an external force suppressing an enlargement of the error, the reward calculation unit may calculate the reward by calculation in which a predicted value of the modified external force is a decrease factor of the reward.

In the first aspect, in a case where the external force is an adversarial external force that is an external force suppressing a reduction of the error, the reward calculation unit may calculate the reward by calculation in which a predicted value of the adversarial external force is an increase factor of the reward.

In the first aspect, in a case where the external force is a modified external force suppressing an enlargement of the error, the reward calculation unit may calculate the reward by calculation in which a predicted value of the modified external force is a decrease factor of the reward, and in a case where the external force is an adversarial external force that is an external force suppressing a reduction of the error, the reward calculation unit may calculate the reward by calculation in which a predicted value of the adversarial external force is an increase factor of the reward.

In the first aspect, the reward calculation unit may calculate the reward by calculation in which a change width of a decrease amount of the reward based on the predicted value of the modified external force during task execution is smaller than a change width of the reward based on the error, and a change width of an increase amount of the reward based on the predicted value of the adversarial external force during task execution is smaller than a change width of the reward based on the error.

In the first aspect, the external force model may include a modified external force model that outputs the predicted value of the modified external force in a case where the external force is the modified external force, and an adversarial external force model that outputs the predicted value of the adversarial external force in a case where the external force is the adversarial external force, and the external force model update unit may include a modified external force model update unit that updates the modified external force model so as to reduce a difference between the predicted value of the modified external force calculated by the modified external force model based on the determined action command and the actual value of the external force in a case where the external force is the modified external force, and an adversarial external force model update unit that updates the adversarial external force model so as to reduce a difference between the predicted value of the adversarial external force calculated by the adversarial external force model based on the determined action command and the actual value of the external force in a case where the external force is the adversarial external force.

In the first aspect, the robot model may include an integrated external force model including the modified external force model and the adversarial external force model, the modified external force model and the adversarial external force model may be neural networks, at least one of one or a plurality of intermediate layers and an output layer of the adversarial external force model may integrate outputs of layers preceding a corresponding layer of the modified external force model by a progressive neural network method, the adversarial external force model may output a predicted value of the external force and identification information indicating whether the external force is the modified external force or the adversarial external force, the integrated external force model may use an output of the adversarial external force model as its own output, and the reward calculation unit may calculate the reward by calculation in which the predicted value of the external force is a decrease factor of the reward in a case where the identification information indicates the modified external force, and may calculate the reward by calculation in which the predicted value of the external force is an increase factor of the reward in a case where the identification information indicates the adversarial external force.

In the first aspect, a reception unit that receives designation of whether the external force is the modified external force or the adversarial external force may be further included; and a learning control unit that validates an operation of the modified external force model update unit in a case where the designation is the modified external force, and validates an operation of the adversarial external force model update unit in a case where the designation is the adversarial external force may be further included.

In the first aspect, a learning control unit that makes a discrimination of whether the external force is the modified external force or the adversarial external force based on the actual value of the position and the posture and the actual value of the external force, validates an operation of the modified external force model update unit in a case where a result of the discrimination is the modified external force, and validates an operation of the adversarial external force model update unit in a case where a result of the discrimination is the adversarial external force may be further included.

A second aspect of the present disclosure is a robot model machine learning method including: preparing a robot model including a state transition model that, based on an actual value of a position and a posture of a robot at a certain time and an action command that can be given to the robot, calculates a predicted value of the position and the posture of the robot at a next time, and an external force model that calculates a predicted value of an external force applied to the robot; acquiring the actual value of the position and the posture and an actual value of the external force applied to the robot for each control cycle; generating and giving a plurality of candidates for the action command to the robot model for each control cycle, and based on a plurality of rewards calculated corresponding to the plurality of candidates for the action command based on a plurality of errors between a plurality of predicted values of the position and the posture calculated by the state transition model corresponding to the plurality of candidates for the action command and a target value of a position and a posture to be reached, and a plurality of the predicted values of the external force calculated by the external force model corresponding to the plurality of candidates for the action command, determining an action command that maximizes the rewards; and updating the external force model so as to reduce a difference between the predicted values of the external force calculated by the external force model based on the determined action command and the actual values of the external force corresponding to the predicted values of the external force.

In the second aspect, updating the state transition model so as to reduce errors between the predicted values of the position and the posture calculated by the state transition model based on the determined action command and the actual values of the position and the posture corresponding to the predicted values of the position and the posture may be further included.

In the second aspect, in a case where the external force is a modified external force that is an external force suppressing an enlargement of the errors, the rewards may be calculated by calculation in which the predicted values of the modified external force are a decrease factor of the rewards.

In the second aspect, in a case where the external force is an adversarial external force that is an external force suppressing a reduction of the errors, the rewards are calculated by calculation in which the predicted values of the adversarial external force are an increase factor of the rewards.

In the second aspect, in a case where the external force is a modified external force suppressing an enlargement of the errors, the rewards may be calculated by calculation in which the predicted values of the modified external force are a decrease factor of the rewards, and in a case where the external force is an adversarial external force that is an external force suppressing a reduction of the errors, the rewards may be calculated by calculation in which the predicted values of the adversarial external force are an increase factor of the rewards.

In the second aspect, the external force model may include a modified external force model that outputs the predicted values of the modified external force in a case where the external force is the modified external force, and an adversarial external force model that outputs the predicted values of the adversarial external force in a case where the external force is the adversarial external force, and the modified external force model may be updated so as to reduce a difference between the predicted values of the modified external force calculated by the modified external force model based on the determined action command and the actual values of the external force in a case where the external force is the modified external force, and the adversarial external force model may be updated so as to reduce a difference between the predicted values of the adversarial external force calculated by the adversarial external force model based on the determined action command and the actual values of the external force in a case where the external force is the adversarial external force.

In the second aspect, the modified external force may be applied to the robot in a case where the errors are enlarging, and the adversarial external force may be applied to the robot in a case where the errors are reducing.

A third aspect of the present disclosure is a robot model machine learning program for machine learning a robot model including a state transition model that, based on an actual value of a position and a posture of a robot at a certain time and an action command that can be given to the robot, calculates a predicted value of the position and the posture of the robot at a next time, and an external force model that calculates a predicted value of an external force applied to the robot, the robot model machine learning program causing a computer to perform processing of: acquiring the actual value of the position and the posture and an actual value of the external force applied to the robot for each control cycle; generating and giving a plurality of candidates for the action command to the robot model for each control cycle, and based on a plurality of rewards calculated corresponding to the plurality of candidates for the action command based on a plurality of errors between a plurality of predicted values of the position and the posture calculated by the state transition model corresponding to the plurality of candidates for the action command and a target value of a position and a posture to be reached, and a plurality of the predicted values of the external force calculated by the external force model corresponding to the plurality of candidates for the action command, determining an action command that maximizes the rewards; and updating the external force model so as to reduce a difference between the predicted values of the external force calculated by the external force model based on the determined action command and the actual values of the external force corresponding to the predicted values of the external force.

A fourth aspect of the disclosure is a robot control device including: a model execution unit that executes a robot model including a state transition model that, based on an actual value of a position and a posture of a robot at a certain time and an action command that can be given to the robot, calculates a predicted value of the position and the posture of the robot at a next time, and an external force model that calculates a predicted value of an external force applied to the robot; an acquisition unit that acquires the actual value of the position and the posture of the robot and an actual value of an external force applied to the robot; a reward calculation unit that calculates a reward based on an error between the predicted value of the position and the posture calculated by the robot model and a target value of a position and a posture to be reached, and the predicted value of the external force calculated by the robot model; and an action determination unit that generates and gives a plurality of candidates for the action command to the robot model for each control cycle, and based on a reward calculated by the reward calculation unit corresponding to each of the plurality of candidates for the action command, determines an action command that maximizes a reward.

A fifth aspect of the present disclosure is a robot control method including: preparing a robot model including a state transition model that, based on an actual value of a position and a posture of a robot at a certain time and an action command that can be given to the robot, calculates a predicted value of the position and the posture of the robot at a next time, and an external force model that calculates a predicted value of an external force applied to the robot; acquiring the actual value of the position and the posture and an actual value of the external force applied to the robot for each control cycle; generating and giving a plurality of candidates for the action command to the robot model for each control cycle, and based on a plurality of rewards calculated corresponding to the plurality of candidates for the action command based on a plurality of errors between a plurality of predicted values of the position and the posture calculated by the state transition model corresponding to the plurality of candidates for the action command and a target value of a position and a posture to be reached, and a plurality of the predicted values of the external force calculated by the external force model corresponding to the plurality of candidates for the action command, determining an action command that maximizes the rewards; and controlling the robot based on the determined action command.

A sixth aspect of the present disclosure is a robot control program for controlling a robot using a robot model including a state transition model that, based on an actual value of a position and a posture of a robot at a certain time and an action command that can be given to the robot, calculates a predicted value of the position and the posture of the robot at a next time, and an external force model that calculates a predicted value of an external force applied to the robot, the robot control program causing a computer to perform processing of: acquiring the actual value of the position and the posture and an actual value of the external force applied to the robot for each control cycle; generating and giving a plurality of candidates for the action command to the robot model for each control cycle, and based on a plurality of rewards calculated corresponding to the plurality of candidates for the action command based on a plurality of errors between a plurality of predicted values of the position and the posture calculated by the state transition model corresponding to the plurality of candidates for the action command and a target value of a position and a posture to be reached, and a plurality of the predicted values of the external force calculated by the external force model corresponding to the plurality of candidates for the action command, determining an action command that maximizes the rewards; and controlling the robot based on the determined action command.

Advantageous Effects of Invention

According to the disclosed technology, it is possible to efficiently learn when learning a robot model by machine learning.

BRIEF DESCRIPTION OF DRAWINGS

FIG. 3 is a diagram for explaining a modified external force and an adversarial external force.

FIG. 12 is a flowchart of a learning process according to the third embodiment.

FIG. 15 is a graph illustrating the number of successes of a task for different peg materials.

DESCRIPTION OF EMBODIMENTS

Figure 1:
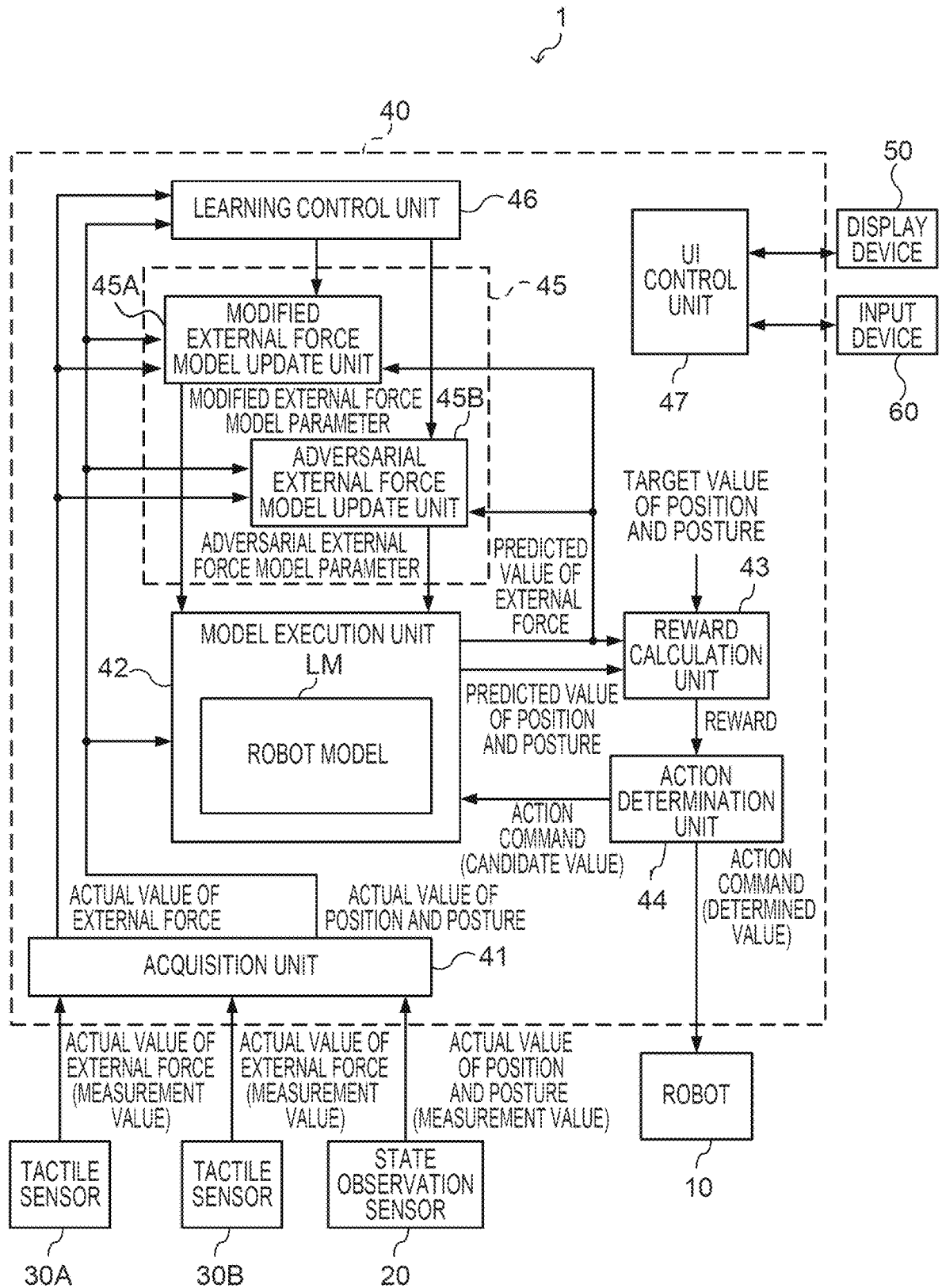
FIG. 1 is a configuration diagram of a robot system according to a first embodiment.

Hereinafter, an example of an embodiment of the disclosed technology will be described with reference to the drawings. Note that, in the drawings, the same or equivalent components and portions are denoted by the same reference signs. Furthermore, dimensional ratios in the drawings may be exaggerated for convenience of description and may be different from actual ratios.

First Embodiment

FIG. 1 illustrates a configuration of a robot system 1 according to the present embodiment. The robot system 1 includes a robot 10, a state observation sensor 20, tactile sensors 30A and 30B, a robot control device 40, a display device 50, and an input device 60.

(Robot)

Figure 2A:
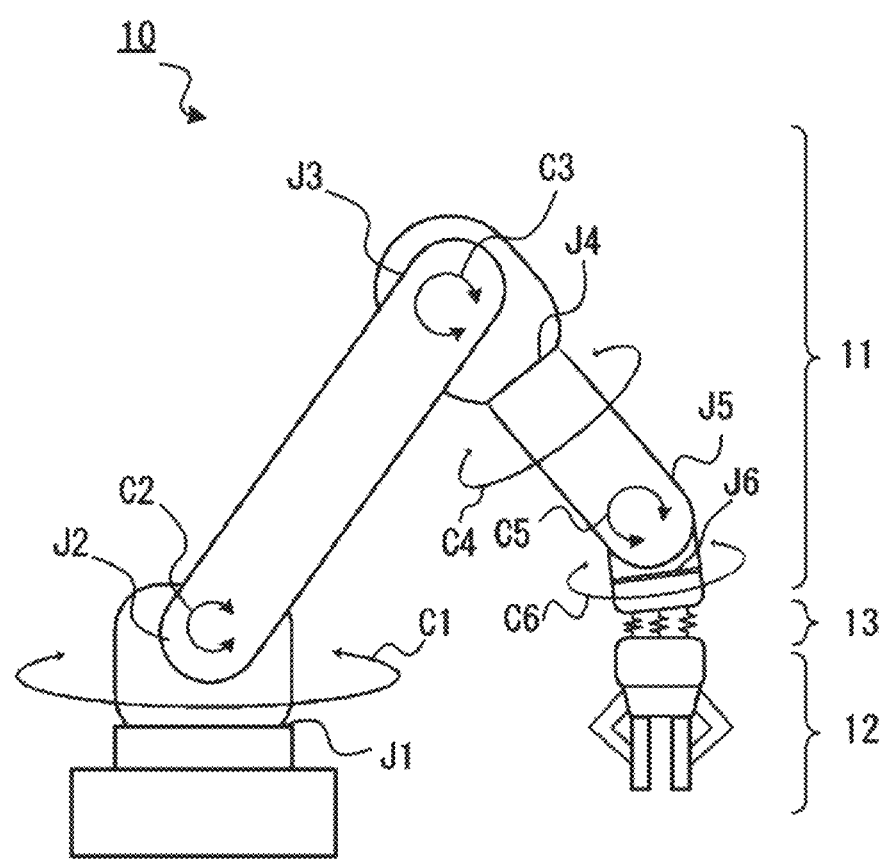
FIG. 2A is a diagram illustrating a schematic configuration of a robot 10.
Figure 2B:
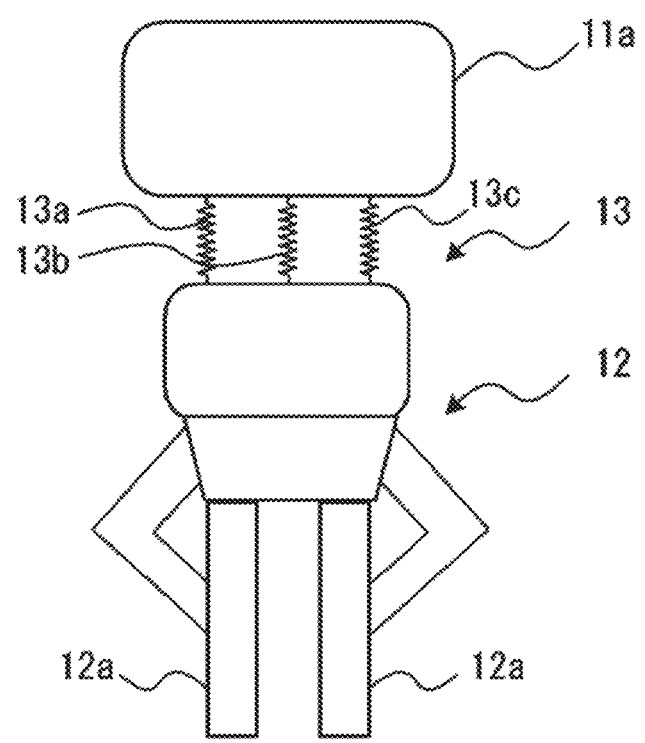
FIG. 2B is an enlarged view of a distal end side of an arm of the robot.

FIGS. 2A and 2B are diagrams illustrating a schematic configuration of the robot 10. The robot 10 in the present embodiment is a six-axis vertical articulated robot, and a gripper (hand) 12 is provided at a distal end 11a of an arm 11 via a flexible portion 13. The robot 10 performs a fitting operation of gripping a component (for example, a peg) by the gripper 12 and fitting the component into a hole. Note that the robot 10 is a real robot in the present embodiment, but may be a virtual robot in simulation.

As illustrated in FIG. 2A, the robot 10 has the arm 11 with six degrees of freedom provided with joints J1 to J6. The joints J1 to J6 rotatably connect the links to each other in directions of arrows C1 to C6, respectively, by a motor (not illustrated). Here, a vertical articulated robot has been described as an example, but a horizontal articulated robot (scalar robot) may be used. Furthermore, although the six-axis robot has been described as an example, an articulated robot having another degree of freedom such as a five-axis robot or a seven-axis robot may be used, or a parallel link robot may be used.

The gripper 12 has a set of clamping portions 12a, and controls the clamping portions 12a to clamp the component. The gripper 12 is connected to the distal end 11a of the arm 11 via the flexible portion 13, and moves with the movement of the arm 11. In the present embodiment, the flexible portion 13 is constituted by three springs 13a to 13c arranged in a positional relationship in which the base of each spring becomes each vertex of an equilateral triangle, but the number of springs may be any number. Furthermore, the flexible portion 13 may be another mechanism as long as it is a mechanism that generates a restoring force against a change in position and obtains flexibility. For example, the flexible portion 13 may be an elastic body such as a spring or rubber, a damper, a pneumatic or hydraulic cylinder, or the like. The flexible portion 13 is preferably configured by a passive element. The flexible portion 13 allows the distal end 11a of the arm 11 and the gripper 12 to relatively move in a horizontal direction and a vertical direction by 5 mm or more, preferably 1 cm or more, and more preferably 2 cm or more.

A mechanism that enables the gripper 12 to switch between a flexible state and a fixed state with respect to the arm 11 may be provided.

Furthermore, here, the configuration in which the flexible portion 13 is provided between the distal end 11a of the arm 11 and the gripper 12 has been exemplified, but the flexible portion may be provided in the middle of the gripper 12 (for example, the position of the finger joint or the middle of the columnar portion of the finger) or in the middle of the arm (for example, at any position of the joints J1 to J6 or in the middle of the columnar portion of the arm). Furthermore, the flexible portion 13 may be provided at a plurality of places among these.

The robot system 1 acquires a robot model for controlling the robot 10 including the flexible portion 13 as described above using machine learning (for example, model-based reinforcement learning). Since the robot 10 has the flexible portion 13, it is safe even if a gripped component is brought into contact with the environment, and fitting work and the like can be realized even if the control cycle is slow. On the other hand, since the positions of the gripper 12 and the component are uncertain due to the flexible portion 13, it is difficult to obtain an analytical robot model. Therefore, in the present embodiment, a robot model is acquired using machine learning.

(State Observation Sensor)

The state observation sensor 20 observes a position and a posture of the gripper 12 as the state of the robot 10, and outputs the observed position and posture as an actual value. As the state observation sensor 20, for example, an encoder of a joint of the robot 10, a visual sensor (camera), motion capture, or the like is used. In a case where a marker for motion capture is attached to the gripper 12, the position and the posture of the gripper 12 can be specified, and the posture of a component (work object) can be estimated from the position and the posture of the gripper 12.

Furthermore, the position and the posture of the gripper 12 itself or the component gripped by the gripper 12 can be detected as the state of the robot 10 by the visual sensor. In a case where a portion between the gripper 12 and the arm 11 is a flexible portion, the position and the posture of the gripper 12 with respect to the arm 11 can also be specified by a displacement sensor that detects a displacement of the gripper 12 with respect to the arm 11.

(Tactile Sensor)

Although not illustrated in FIG. 2, the tactile sensors 30A and 30B are attached to a gripper body 12b of the gripper 12 as illustrated in FIG. 3.

As an example, the tactile sensors 30A and 30B are provided at positions along a direction in which one pair of the clamping portions 12a faces each other. The tactile sensors 30A and 30B are sensors that detect three-axis or six-axis forces as an example, and can detect the magnitude and direction of an external force applied to the tactile sensors. A user applies an external force to the gripper 12 by holding the gripper body 12b and moving the gripper 12 such that a hand (finger) is in contact with both of the tactile sensors 30A and 30B.

As the external force, there are a modified external force that provides an advisory such that the task (work) executed by the robot 10 succeeds, and an adversarial external force that makes an adversarial such that the task fails. The modified external force is an external force that suppresses an enlargement of an error between a predicted value of the position and the posture of the robot 10 predicted by the robot model and a target value of the position and the posture that the robot 10 should reach. Furthermore, the adversarial external force is an external force that reduces the enlargement of the error between the predicted value of the position and the posture of the robot 10 predicted by the robot model and the target value of the position and the posture that the robot 10 should reach.

Specifically, in a case where the task executed by the robot 10 is a task of inserting a peg 70 into a hole 74 provided in a table 72 as illustrated in FIG. 3, it is necessary to move the peg 70 in a direction of an arrow A in order to insert the peg 70 into the hole 74. In this case, an external force applied in the direction of the arrow A, which is the correct direction for succeeding the task of inserting the peg 70 into the hole 74, is the modified external force. On the other hand, an external force applied in a direction of an arrow B, which is the direction in which the task is failed and is opposite to the direction of the arrow A, is the adversarial external force.

In the case of FIG. 3, when the user grips the gripper 12 and applies the modified external force in the direction of the arrow A, the force detected by the tactile sensor 30A becomes larger than that of the tactile sensor 30B, and it can be determined that the modified external force is applied. On the other hand, when the adversarial external force is applied in the direction of the arrow B, the force detected by the tactile sensor 30B becomes larger than the force detected by the tactile sensor 30A, and it can be determined that the adversarial external force is applied.

Note that, in the present embodiment, a case where the gripper body 12b is provided with the two tactile sensors 30A and 30B is described, but the disclosed technology is not limited thereto. For example, three or more tactile sensors may be provided at equal intervals around the gripper body 12b. When three or more tactile sensors are provided and the detection results thereof are integrated, at least in a case where the direction of the external force in a plane perpendicular to an axis of the gripper 12 is known, each tactile sensor may detect only the magnitude of the external force.

(Robot Control Device)

The robot control device 40 functions as a learning device that learns a robot model by machine learning. Furthermore, the robot control device 40 also functions as a control device that controls the robot 10 using the learned robot model.

Figure 4:
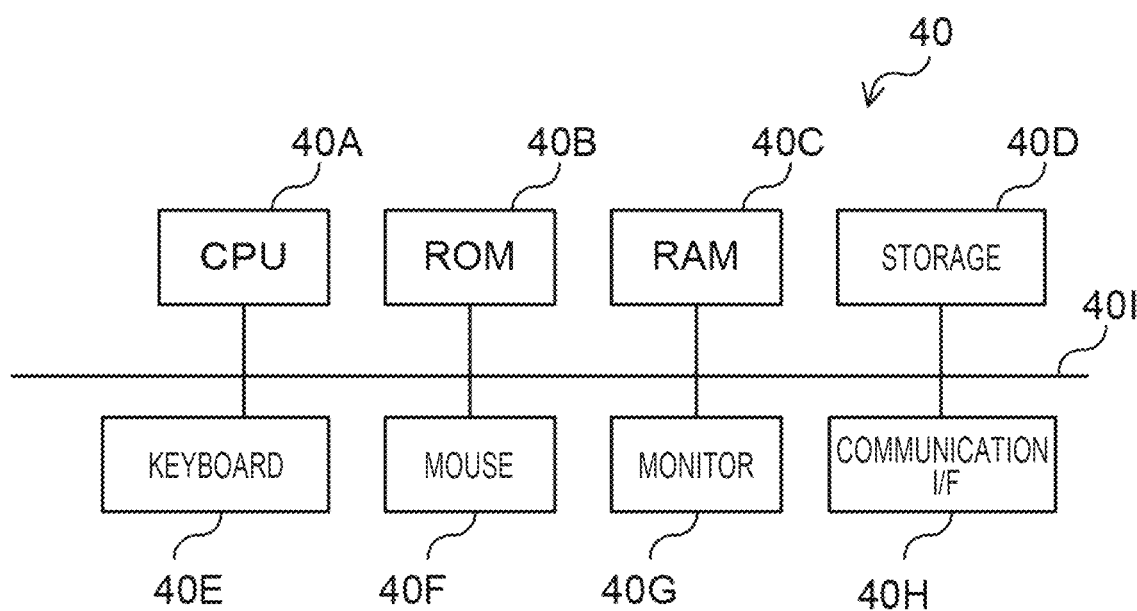
FIG. 4 is a block diagram illustrating a hardware configuration of a robot control device.

FIG. 4 is a block diagram illustrating a hardware configuration of the robot control device according to the present embodiment. As illustrated in FIG. 4, the robot control device 40 has a configuration similar to that of a general computer (information processing device), and includes a central processing unit (CPU) 40A, a read only memory (ROM) 40B, a random access memory (RAM) 40C, a storage 40D, a keyboard 40E, a mouse 40F, a monitor 40G, and a communication interface 40H. The respective configurations are communicably connected to each other via a bus 401.

In the present embodiment, the ROM 40B or the storage 40D stores a program for machine learning of a robot model and a robot control program. The CPU 40A is a central processing unit, and executes various programs and controls each configuration. That is, the CPU 40A reads the programs from the ROM 40B or the storage 40D, and executes the programs using the RAM 40C as a work area. The CPU 40A performs control of each of the above-described configurations and various types of arithmetic processing according to the programs recorded in the ROM 40B or the storage 40D. The ROM 40B stores various programs and various data. The RAM 40C temporarily stores a program or data as a work area. The storage 40D includes a hard disk drive (HDD), a solid state drive (SSD), or a flash memory, and stores various programs including an operating system and various data. The keyboard 40E and the mouse 40F are examples of the input device 60, and are used to perform various inputs. The monitor 40G is, for example, a liquid crystal display, and is an example of the display device 50. The monitor 40G may employ a touch panel system and function as the input device 60. The communication interface 40H is an interface for communicating with other devices, and for example, standards such as Ethernet (registered trademark), FDDI, or Wi-Fi (registered trademark) are used.

Next, a functional configuration of the robot control device 40 will be described.

As illustrated in FIG. 1, the robot control device 40 includes, as a functional configuration thereof, an acquisition unit 41, a model execution unit 42, a reward calculation unit 43, an action determination unit 44, an external force model update unit 45, a learning control unit 46, and a user interface (UI) control unit 47. Each functional configuration is realized by the CPU 40A reading a machine learning program stored in the ROM 40B or the storage 40D, developing the machine learning program in the RAM 40C, and executing the machine learning program. Note that some or all of the functions may be implemented by a dedicated hardware device.

The acquisition unit 41 acquires an actual value of the position and the posture of the robot 10 and an actual value of the external force applied to the robot 10. The position and the posture of the robot 10 are, for example, a position and a posture of the gripper 12 as an end effector of the robot 10. The external force applied to the robot 10 is, for example, an external force applied to the gripper 12 as the end effector of the robot 10. The actual value of the external force is measured by the tactile sensors 30A and 30B. Note that, in a case where the robot 10 is a robot in which it is difficult to specify which portion is the end effector, it is only required to appropriately specify a portion for measuring a position and a posture and a portion to which an external force is applied from the viewpoint of the portion of the robot where the influence on the object to be operated occurs.

In the present embodiment, since the gripper 12 is provided at the distal end 11a of the arm 11 via the flexible portion 13, a configuration that can be physically and flexibly displaced when an external force is applied to the gripper 12 or can be displaced by control according to the external force is preferable. Note that the disclosed technology can also be applied by manually applying an external force to a hard robot having no flexibility.

In the present embodiment, the position and the posture of the robot 10 are represented by a value of a maximum of six degrees of freedom in total of three degrees of freedom of position and three degrees of freedom of posture, but may be a smaller degree of freedom according to the degree of freedom of movement of the robot 10. For example, in the case of a robot in which posture change of the end effector does not occur, the "position and posture" may have only three degrees of freedom of position.

The model execution unit 42 executes a robot model LM.

Figure 5:
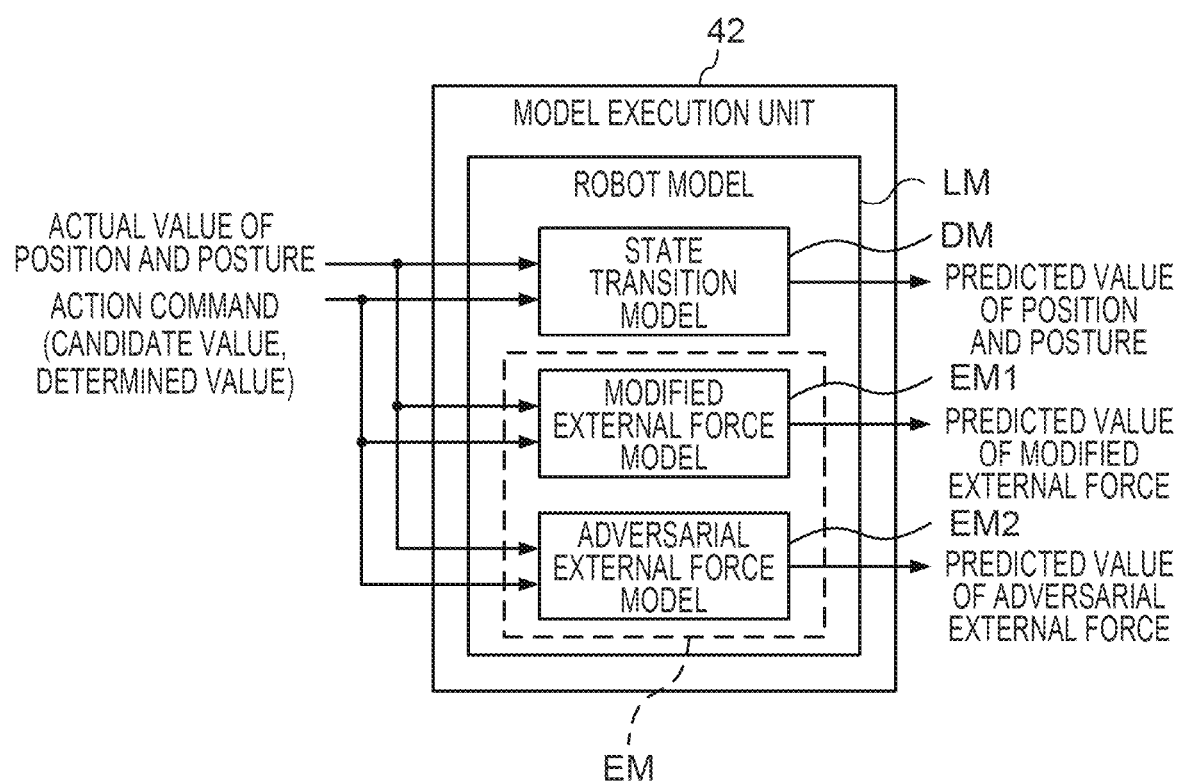
FIG. 5 is a configuration diagram of a robot model.

As illustrated in FIG. 5, the robot model LM includes a state transition model DM that calculates a predicted value of the position and the posture of the robot 10 at the next time on the basis of the actual value (measurement value) of the position and the posture at a certain time and an action command (candidate value or determined value) that can be given to the robot 10, and an external force model EM that calculates a predicted value of an external force applied to the robot 10.

Note that the robot model LM "based on" (=input) or "calculate" (=output) means that the model execution unit 42 executes the model using input data to calculate (generate) output data when executing the model.

The external force model EM includes a modified external force model EM1 that outputs a predicted value of a modified external force and an adversarial external force model EM2 that outputs a predicted value of an adversarial external force.

The reward calculation unit 43 calculates a reward on the basis of an error between the predicted value of the position and the posture and the target value of the position and the posture to be reached, and the predicted value of the external force. The position and the posture to be reached may be a position and a posture to be reached at the time of completion of the task, or may be a position and a posture as an intermediate target before completion of the task.

In a case where the external force is a modified external force that is an external force that suppresses an enlargement of the error, the reward calculation unit 43 calculates a reward by calculation in which a predicted value of the modified external force is a decrease factor of the reward.

The modified external force, which is an external force that suppresses the error from being enlarged, is an external force that blunts the speed of enlargement in a situation where the error in the position and the posture is enlarging, and may not be an external force that turns the enlargement of the error into reduction.

The calculation in which the predicted value of the modified external force is the decrease factor of the reward means that the reward in the case of calculation using the predicted value of the modified external force calculated by the external force model is smaller than the reward in the case of calculation with the predicted value of the modified external force set to 0. Note that the decrease does not mean a temporal decrease, and the reward does not necessarily decrease with the lapse of time even if the predicted value of the modified external force calculated by the modified external force model EM1 is used for calculation.

Even in a case where the error in the position and the posture enlarges, it is preferable to apply the modified external force when the error in the position and the posture is large (for example, when the peg 70 is largely separated from the hole 74 in FIG. 3), and it is not necessary to apply the modified external force when the error in the position and the posture is small (when the peg 70 is near the hole 74). Furthermore, when the error of the position and the posture is large, it is preferable to apply a larger modified external force as the speed at which the error of the position and the posture enlarges is large.

Furthermore, the reward calculation unit 43 calculates the reward by calculation in which a width of change in the decrease amount of the reward based on the predicted value of the modified external force during task execution is smaller than a width of change in the reward based on the error.

Furthermore, in a case where the external force is an adversarial external force that is an external force that suppresses a reduction of the error, the reward calculation unit 43 calculates the reward by calculation in which a predicted value of the adversarial external force is an increase factor of the reward.

The adversarial external force, which is an external force that suppresses the reduction of the error, is an external force that blunts the speed of reduction in a situation where the error of the position and the posture is reduced, and may not be an external force that turns the reduction of the error into enlargement.

The calculation in which the predicted value of the adversarial external force is the increase factor of the reward means that the reward in the case of calculation using the predicted value of the adversarial external force calculated by the adversarial external force model is larger than the reward in the case of calculation with the predicted value of the adversarial external force set to 0. Note that the increase does not mean a temporal increase, and the reward does not necessarily increase with the lapse of time even if the predicted value of the adversarial external force calculated by the adversarial external force model EM2 is used for calculation.

Even in a case where the error in the position and the posture is reduced, it is preferable to apply the adversarial external force when the error in the position and the posture is small (for example, when the peg 70 is near the hole 74 in FIG. 3), and it is not necessary to apply the adversarial external force when the error in the position and the posture is large. Furthermore, when the error of the position and the posture is small, it is preferable to apply a larger adversarial external force as the speed at which the error of the position and the posture is reduced is larger.

Furthermore, the reward calculation unit 43 calculates the reward by calculation in which a width of change in the increase amount of the reward based on the predicted value of the adversarial external force during task execution is smaller than a width of change in the reward based on the error.

The action determination unit 44 generates a plurality of candidates for the action command for each control cycle, gives the generated candidates to the robot model LM, and determines an action command that maximizes the reward on the basis of the reward calculated by the reward calculation unit 43 corresponding to each of the plurality of candidates for the action command.

The action command is a speed command in the present embodiment, but may be a position command, a torque command, a combination command of speed, position, and torque, or the like. Furthermore, the action command may be a sequence of action commands over a plurality of times. Furthermore, the plurality of candidates for the action command may be candidates of a plurality of sequences of the action command.

Maximizing the reward only needs to be maximized as a result of searching within a limited time, and the reward does not need to be a true maximum value in the situation.

The external force model update unit 45 updates the external force model so as to reduce a difference between a predicted value of the external force calculated by the external force model on the basis of the determined action command and an actual value of the external force corresponding to the predicted value of the external force.

The external force model update unit 45 includes a modified external force model update unit 45A and an adversarial external force model update unit 45B.

The modified external force model update unit 45A updates the modified external force model EM1 so as to reduce a difference between the predicted value of the modified external force calculated by the modified external force model EM1 based on the action command determined by the action determination unit 44 and the actual value of the modified external force.

The adversarial external force model update unit 45B updates the adversarial external force model EM2 so as to reduce a difference between the predicted value of the adversarial external force calculated by the adversarial external force model EM2 based on the action command determined by the action determination unit 44 and the actual value of the adversarial external force.

The learning control unit 46 makes a discrimination of whether the external force is the modified external force or the adversarial force on the basis of the actual value of the position and the posture and the actual value of the external force, validates an operation of the modified external force model update unit in a case where a result of the discrimination is the modified external force, and validates an operation of the adversarial external force model update unit 45B in a case where a result of the discrimination is the adversarial external force. Moreover, in a case where the result of the discrimination is not the modified external force, the operation of the modified external force model update unit 45A is invalidated, and in a case where the result of the discrimination is not the adversarial external force, the operation of the adversarial external force model update unit 45B is invalidated.

Note that, in the present embodiment, a case where the learning control unit 46 automatically discriminates whether the external force is the modified external force or the adversarial external force on the basis of the actual value of the position and the posture and the actual value of the external force is described. However, the learning control unit 46 may further include a reception unit that receives designation of whether the external force is the modified external force or the adversarial external force.

In this case, the user operates the input device 60 to specify whether the external force applied to the gripper 12 is a modified external force or an adversarial external force, and applies the external force to the gripper 12.

Then, the learning control unit 46 validates the operation of the modified external force model update unit 45A in a case where the designation is the modified external force, and validates the operation of the adversarial external force model update unit 45B in a case where the designation is the adversarial external force. Moreover, in a case where the designation is not the modified external force, the operation of the modified external force model update unit 45A is invalidated, and in a case where the designation is not the adversarial external force, the operation of the adversarial external force model update unit 45B is invalidated.

Figure 6:
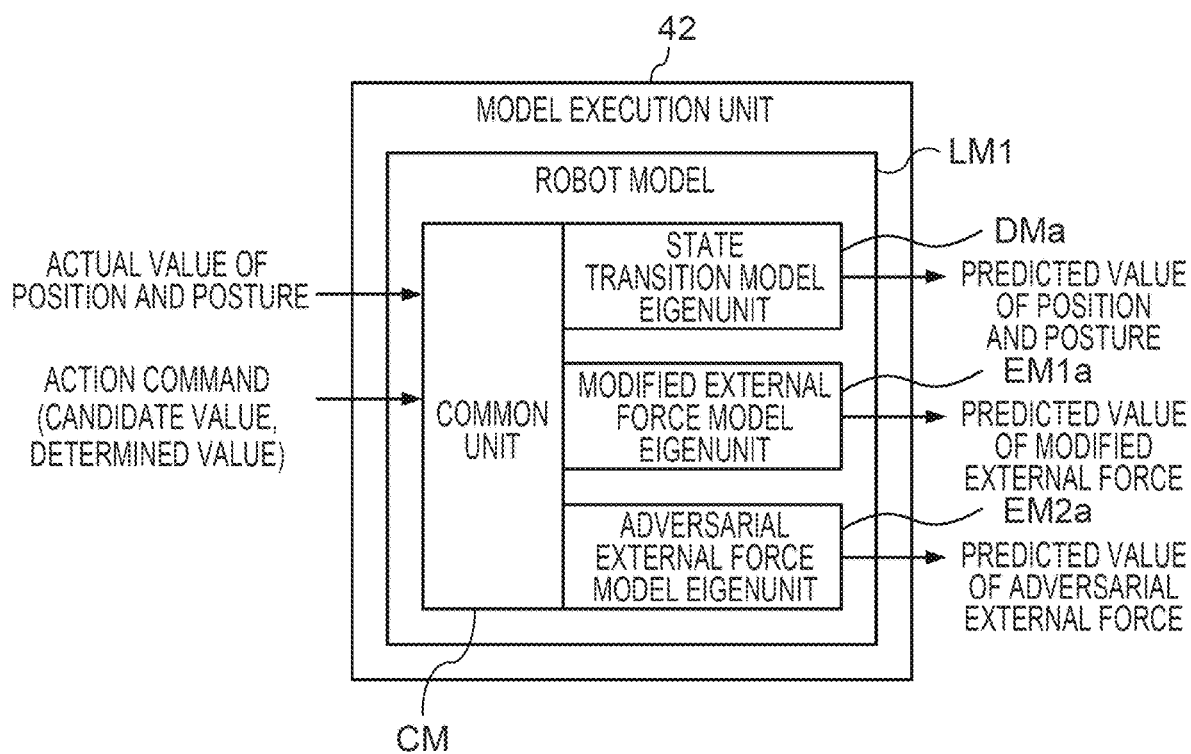
FIG. 6 is a configuration diagram of a robot model according to a modification example.

Note that, in the example of FIG. 5, the state transition model DM, the modified external force model EM1, and the adversarial external force model EM2 are independent models, but the configuration of the robot model LM is not limited thereto. For example, as in a robot model LM1 illustrated in FIG. 6, the robot model LM1 may include a common unit CM, a state transition model eigenunit DMa, a modified external force model eigenunit EM1*a*, and an adversarial external force model eigenunit EM2*a*. In this case, the common unit CM performs processing common to the state transition model DM, the modified external force model EM1, and the adversarial external force model EM2. The modified external force model eigenunit EM1*a* performs processing unique to the modified external force model EM1. The adversarial external force model eigenunit EM2*a* performs processing unique to the adversarial external force model EM2.

Figure 7:
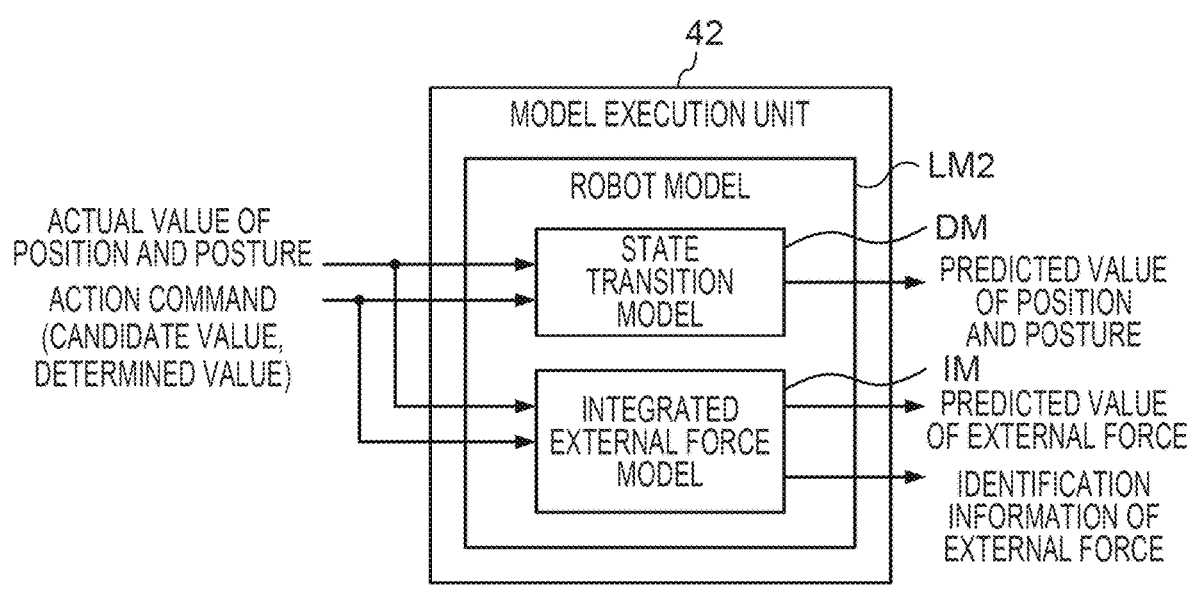
FIG. 7 is a configuration diagram of a robot model according to a modification example.

Furthermore, as in a robot model LM2 illustrated in FIG. 7, an integrated external force model IM including the modified external force model EM1 and the adversarial external force model EM2 of FIG. 5 may be included. In this case, the integrated external force model IM outputs a predicted value of the external force and also outputs identification information for identifying whether the external force is a modified external force or an adversarial external force.

The integrated external force model IM may be obtained by integrating the modified external force model EM1 and the adversarial external force model EM2 by a progressive neural network method. In this case, the modified external force model EM1 and the adversarial external force model are constituted by a neural network. Then, at least one of the one or a plurality of intermediate layers and an output layer of the adversarial external force model EM2 integrates outputs of the previous layers of the corresponding layer of the modified external force model EM1 by a progressive neural network (PNN) method.

Figure 8:
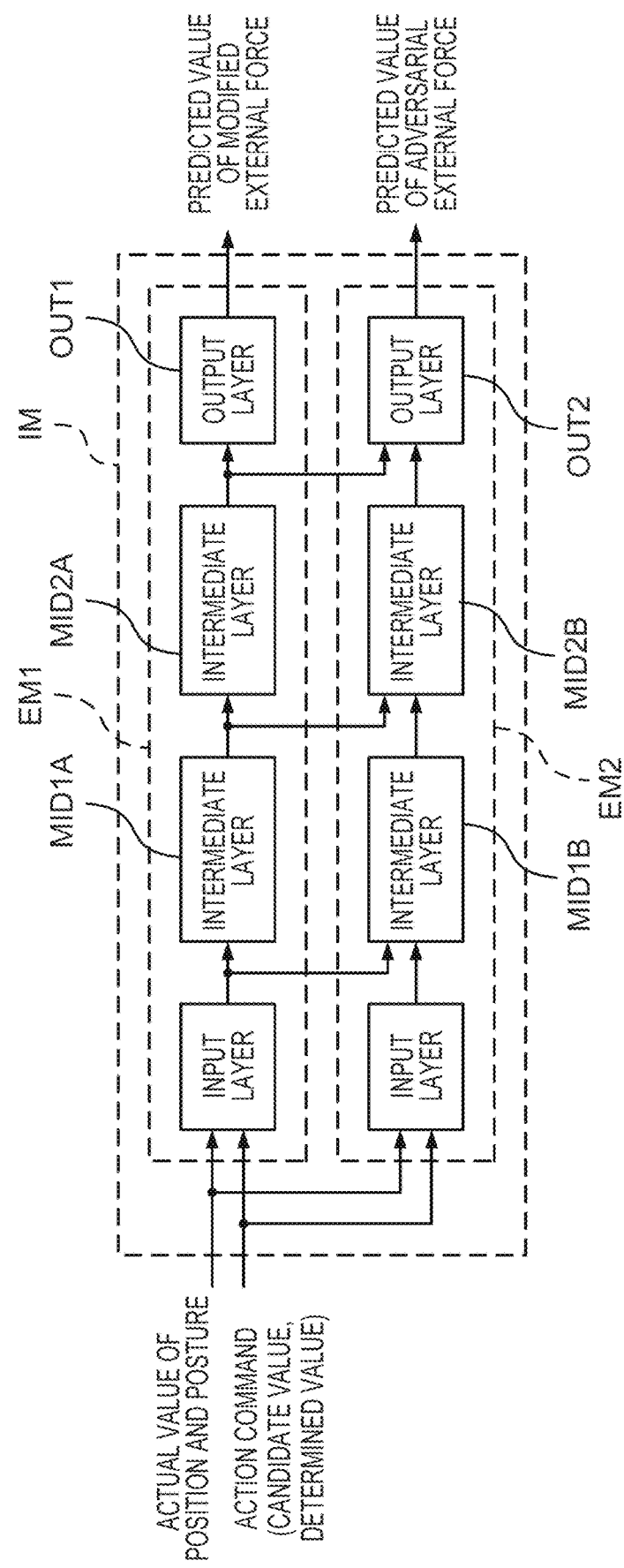
FIG. 8 is a configuration diagram of an integrated external force model.

In the example of FIG. 8, an output of an intermediate layer MID2A, which is a previous layer of a corresponding output layer OUT1 of the modified external force model EM1, is input to an output layer OUT2 of the adversarial external force model EM2. Furthermore, an output of an intermediate layer MID1A, which is a previous layer of the corresponding intermediate layer MID2A of the modified external force model EM1, is input to an intermediate layer MID2B of the adversarial external force model EM2.

For such an integrated external force model IM, machine learning of the modified external force model EM1 is first performed, and then machine learning of the adversarial external force model EM2 is performed. While the learning of the modified external force model EM1 is performed by applying the modified external force, a weight parameter between the layers of the modified external force model EM1 is updated such that an error of the predicted value of the modified external force with respect to the actual value of the modified external force becomes small, and the adversarial external force model EM2 is not updated. A weight parameter of a path from one layer (for example, MID1A) to the next layer (MID2A) of the modified external force model EM1 and a weight parameter of a path from the same layer (MID1A) to the layer (MID2B) of the adversarial external force model are always the same value. One layer (for example, MID2B) of the adversarial external force model EM2 outputs the sum of the weighted input from the layer (for example, MID1A) of the modified external force model to the layer and the weighted input from the previous layer (MID1B) of the adversarial external force model EM2 to the subsequent layer (OUT2) of the adversarial external force model EM2. After the learning of the modified external force model EM1 is completed, while the learning of the adversarial external force model EM2 is performed by applying the adversarial external force, the weight parameter between the layers of the adversarial external force model EM2 is updated such that an error of the predicted value of the adversarial external force with respect to the actual value of the adversarial external force becomes small, and the modified external force model EM1 is not updated. In the operation phase after the learning of the adversarial external force model EM2 is completed, the output of the adversarial external force model EM2 is used as the predicted value of the external force, and the output of the modified external force model EM1 is not used. By performing the machine learning of the external force in this manner, it is possible to perform learning regarding the adversarial external force without breaking a learning result regarding the modified external force performed earlier, while being a model obtained by integrating the modified external force model EM1 and the adversarial external force model EM2.

In the integrated external force model IM, an identification unit (not illustrated) identifies whether the predicted value of the external force is the predicted value of the modified external force or the predicted value of the adversarial external force, and outputs an identification result as identification information. In this case, the reward calculation unit 43 calculates the reward by calculation in which the predicted value of the external force is a decrease factor of the reward in a case where the identification information indicates the predicted value of the modified external force, and calculates the reward by calculation in which the predicted value of the external force is an increase factor of the reward in a case where the identification information indicates the predicted value of the adversarial external force.

Note that the technique of the progressive neural network refers to, for example, a technique described in the following reference.
(Reference Literatures) Rusu et al., "Progressive neural networks," arXiv preprint arXiv:1606.04671, 2016.

Furthermore, regarding the progressive neural network, there are the following reference article.
(Reference Articles) Continual Learning in a Plurality of Games https://wba-initiative.org/wp-content/uploads/2015/05/20161008-hack2-noguchi.pdf
(Learning Process of Robot Model)

Figure 9:
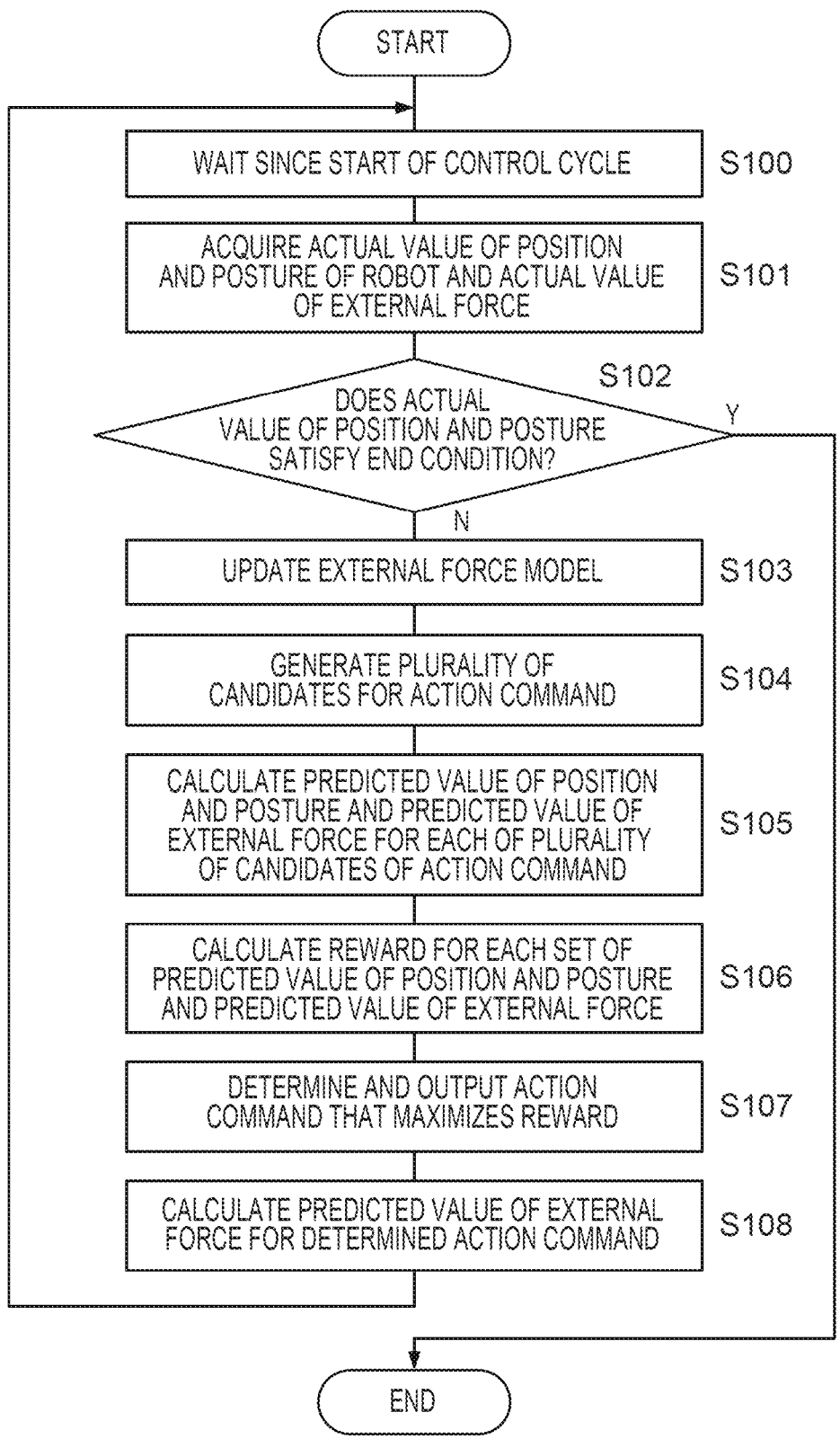
FIG. 9 is a flowchart of a learning process according to the first embodiment.

FIG. 9 is a flowchart illustrating a flow of a machine learning process of learning the robot model LM using machine learning. The machine learning process of FIG. 9 is executed by the CPU 40A reading a machine learning program stored in the ROM 40B or the storage 40D and developing the machine learning program in the RAM 40C.

The processing of steps S100 to S108 described below is executed at regular time intervals according to a control cycle. The control cycle is set to a time during which the processing of steps S100 to S108 can be executed.

In step S100, the CPU 40A performs processing of waiting until a predetermined time corresponding to a length of the control cycle has elapsed since the start of a previous control cycle. Note that the processing of step S100 may be omitted, and the processing of the next control cycle may be started immediately after the processing of the previous control cycle is completed.

In step S101, the CPU 40A acquires the actual value (measurement value) of the position and the posture of the robot 10 from the state observation sensor 20, and acquires the actual value (measurement value) of the external force from the tactile sensors 30A and 30B.

In step S102, the CPU 40A, as the acquisition unit 41, determines whether or not the actual value of the position and the posture acquired in step S101 satisfies a predetermined end condition. Here, the case where the end condition is satisfied is, for example, a case where an error between the actual value of the position and the posture and a target value of a position and a posture to be reached is within a specified value. The position and the posture to be reached is a position and a posture of the robot 10 when the robot 10 can insert the peg 70 into the hole 74 in the case of the present embodiment.

In a case where the determination in step S102 is an affirmative determination, this routine is ended. On the other hand, in a case where the determination in step S102 is a negative determination, the process proceeds to step S103.

In step S103, the CPU 40A updates the external force model EM as the external force model update unit 45. Specifically, first, it is determined whether the external force is a modified external force or an adversarial external force on the basis of the actual value of the position and the posture and the actual value of the external force acquired in step S101. For example, an external force detected as a force in a direction that suppresses the enlargement of the error when the error between the actual value of the position and the posture and the target value of the position and the posture to be reached is enlarged can be discriminated as a modified external force, and an external force detected as a force in a direction that suppresses the reduction of the error when the error is reduced can be discriminated as an adversarial external force, but the discrimination method is not limited thereto.

Then, in a case where the discriminated external force is the modified external force, the modified external force model parameter of the modified external force model EM1 is updated so that a difference between the predicted value of the modified external force calculated by the modified external force model EM1 based on the determined action command and the actual value of the modified external force is reduced.

On the other hand, in a case where the discriminated external force is an adversarial external force, the adversarial external force model parameter of the adversarial external force model EM2 is updated so that a difference between the predicted value of the adversarial external force calculated by the adversarial external force model EM2 on the basis of the determined action command and the actual value of the adversarial external force is reduced.

In step S104, the CPU 40A, as the action determination unit 44, generates a plurality of candidates for an action command (or action command series) for the robot 10. In the present embodiment, for example, n (for example, 300) speed command value candidates are randomly generated and output to the model execution unit 42 as candidate values of the action command.

In step S105, the CPU 40A, as the model execution unit 42, calculates a predicted value of the position and the posture and a predicted value of the external force for each of the plurality of candidates of the action command generated in step S104. Specifically, the actual value of the position and the posture and the n candidate values of the action command are input to the robot model LM, and the predicted value of the position and the posture and the predicted value of the modified external force or the predicted value of the adversarial external force corresponding to the candidate values of the action command are calculated.

In step S106, the CPU 40A, as the reward calculation unit 43, calculates a reward for each set of the predicted value of the position and the posture and the predicted value of the modified external force corresponding to the n candidate values of the action command. That is, n rewards are calculated.

A reward r1 in a case where the external force is a modified external force can be calculated using the following Formula (1).

$$r1 = -r^R - \alpha 1 \|s1^H\|^2 \quad (1)$$

Here, $r^R$ is an error between the predicted value of the position and the posture and the target value of the position and the posture to be reached. $s1^H$ is a modified external force. $\alpha 1$ is a weight and is set in advance. $\alpha 1$ is set such that a change width of the decrease amount of the reward r1 based on the predicted value of the modified external force during the execution of the task is smaller than a change width of the reward r1 based on an error between the predicted value of the position and the posture and the target value of the position and the posture to be reached.

On the other hand, a reward r2 in a case where the external force is an adversarial external force can be calculated using the following Formula (2).

$$r2 = -r^R - \alpha 2 \|s2^H\|^2 \qquad (2)$$

Here, $s2^H$ is an adversarial external force. $\alpha 2$ is a weight and is set in advance. $\alpha 2$ is set such that a change width of the increase amount of the reward r2 based on the predicted value of the adversarial external force during the execution of the task is smaller than a change width of the reward r2 based on an error between the predicted value of the position and the posture and the target value of the position and the posture to be reached.

As shown in the above Formulas (1) and (2), in a case where the external force is the same, the larger the error between the predicted value of the position and the posture and the target value of the position and the posture to be reached, the smaller the reward. Furthermore, as shown in the above Formula (1), in a case where the errors are the same, the reward decreases as the modified external force increases. Furthermore, as shown in the above Formula (2), in a case where the errors are the same, the reward increases as the adversarial external force increases.

In step S107, the CPU 40A, as the action determination unit 44, determines an action command that maximizes the reward and outputs the action command to the robot 10. For example, a relational expression representing the correspondence relationship between the n candidate values of the action command and the reward is calculated, and the candidate value of the action command corresponding to the maximum reward on a curve represented by the calculated relational expression is set as a determined value. Furthermore, an action command that can maximize reward may be specified using a so-called cross-entropy method (CEM). As a result, an action command that maximizes the reward can be obtained.

Steps S104 to S106 may be repeated a predetermined number of times. In this case, after executing the first step S106 as the action determination unit 44, the CPU 40A extracts m candidate values of the action command with a higher reward from the set of the n candidate values of the action command and the reward, obtains an average and a variance of the m candidate values of the action command, and generates a normal distribution according to the average and the variance. In the second step S104, the CPU 40A, as the action determination unit 44, generates new n candidate values of the speed command so that the probability density coincides with the obtained normal distribution, not randomly. Similarly, steps S104 to S106 are executed a predetermined number of times. In this way, the accuracy of maximizing the reward can be enhanced.

The robot 10 operates in accordance with the determined value of the action command. The user applies an external force to the robot 10 according to the operation of the robot 10. Specifically, an external force is applied to the gripper 12. The user preferably applies a modified external force to the robot 10 in a case where an error between the predicted value of the position and the posture and the target value of the position and the posture to be reached is enlarging, and preferably applies an adversarial external force to the robot 10 in a case where the error is reducing. That is, for example, in a case where the peg 70 is moving in a direction away from the hole 74 by the operation of the robot 10, the user applies a modified external force to the gripper 12 in a direction in which the peg 70 approaches the hole 74. Furthermore, for example, in a case where the peg 70 is moving in a direction approaching the hole 74 due to the operation of the robot 10, an adversarial external force is applied to the gripper 12 in a direction in which the peg 70 moves away from the hole 74.

Note that it is preferable to first apply the modified external force in the process of machine learning the external force model. This is because when an adversarial external force is applied first, learning may be delayed. Furthermore, a ratio of the modified external force and the adversarial external force to be applied may be one to one, or the ratio of the modified external force may be increased. Furthermore, as the order of applying the modified external force and the adversarial external force, the modified external force may be applied a plurality of times and then the adversarial external force may be applied a plurality of times, or the modified external force and the adversarial external force may be alternately applied.

Furthermore, instead of applying the modified external force or the adversarial external force by a human, the modified external force or the adversarial external force may be automatically applied by a robot or the like that applies the external force.

In step S108, the CPU 40A, as the model execution unit 42, calculates a predicted value of the external force for the determined value of the action command determined in step S107, and returns to step S100.

In this manner, the processing of steps S100 to S108 is repeated for each control cycle until the actual value of the position and the posture satisfies the end condition.

As a result, the robot model LM is learned. As described above, the robot model LM includes the modified external force model EM1 and the adversarial external force model EM2, and since the user learns the robot model LM while applying the modified external force or the adversarial external force to the robot 10, it is possible to efficiently learn and to obtain the robot model LM having excellent robustness against environmental changes such as a change in the shape and material of a component to be operated of the robot 10 and a secular change in physical characteristics of the robot 10.

Note that, in the operation phase, the model execution unit 42 executes the robot model LM learned by the learning process in FIG. 9. The functional configuration of the robot control device 40 in the operation phase is a configuration in which the external force model update unit 45 and the learning control unit 46 are omitted from the functional configuration in FIG. 1. The robot control process in the operation phase is a process obtained by removing the processing of "acquiring the actual value of the external force" in step S101 and the update processing of updating the external force model in step S103 from the learning process in FIG. 9, and a program for executing this processing is a robot control processing program.

Note that the device that executes the learning process of the robot model in the learning phase and the device that executes the robot control process in the operation phase may be separate devices or the same. For example, the learning device used for learning may be directly used as the robot control device 40, and control using the learned robot model LM may be performed. Furthermore, the robot control device 40 may perform control while continuing learning.

Modification Example of First Embodiment

In the first embodiment, the state transition model DM has a configuration in which the actual value of the position and the posture and the action command are input, but the actual value of the external force is not input. Alternatively, the state transition model DM may be configured to also receive the actual value of the external force. In that case, the state transition model DM calculates the predicted value of the position and the posture on the basis of the actual value of the position and the posture, the action command, and the actual value of the external force. However, the application of the modified external force or the adversarial external force to the tactile sensors 30A and 30B is limited to a period during which machine learning of the external force models EM1, EM2, EM1*a*, EM2*a*, and IM is performed. In the operation phase, the state transition model DM calculates the predicted value of the position and the posture while maintaining the state in which the input of the actual value of the external force is substantially zero. On the other hand, similarly in this modification example, the external force model calculates the predicted value of the external force from the actual value of the position and the posture and the action command without inputting the actual value of the external force. The predicted value of the external force affects action determination through being used for reward calculation. Modifications similar to this modification example can also be made in the following embodiments.

Second Embodiment

Next, a second embodiment of the disclosed technology will be described. Note that the same parts as those of the first embodiment are denoted by the same reference signs, and a detailed description thereof will be omitted.

Since the robot system 1 according to the second embodiment is the same as that of the first embodiment, the description thereof will be omitted.
(Learning Process of Robot Model)

Figure 10:
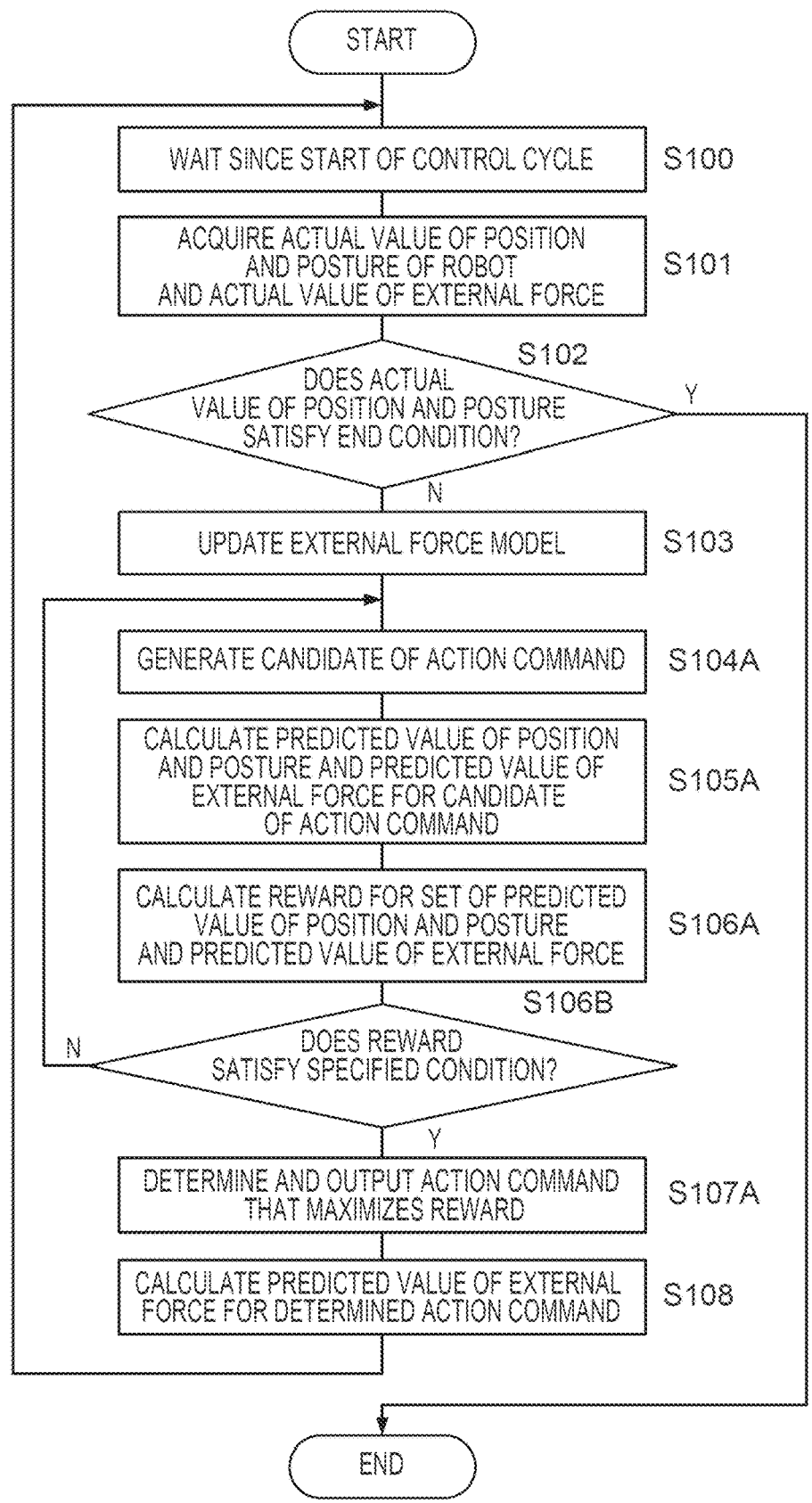
FIG. 10 is a flowchart of a learning process according to a second embodiment.

FIG. 10 is a flowchart illustrating a flow of a machine learning process according to the second embodiment. The machine learning process of FIG. 10 is executed by the CPU 40A reading a machine learning program stored in the ROM 40B or the storage 40D and developing the machine learning program in the RAM 40C.

Since the processing of steps S100 to S103 and S108 is the same as the processing of FIG. 9, the description thereof will be omitted.

In step S104A, the CPU 40A, as the action determination unit 44, generates one candidate for an action command (or action command sequence) for the robot 10.

In stepS105A, the CPU 40A, as the model execution unit 42, calculates a predicted value of the position and the posture and a predicted value of the external force for one candidate of the action command generated in step S104A. Specifically, the actual value of the position and the posture and the candidate value of the action command are input to the robot model LM, and the predicted value of the position and the posture, and the predicted value of the modified external force or the predicted value of the adversarial external force corresponding to the candidate value of the action command are calculated.

In step S106A, the CPU 40A, as the reward calculation unit 43, calculates a reward on the basis of a set of the predicted value of the position and the posture and the predicted value of the external force corresponding to the candidate value of the action command. That is, in a case where the external force is a modified external force, the reward r1 is calculated by Formula (1) above, and in a case where the external force is an adversarial external force, the reward r2 is calculated by Formula (2) above.

In step S106B, the CPU 40A determines whether or not the reward calculated in step S106A satisfies a specified condition. Here, the case where the specified condition is satisfied is, for example, a case where the reward exceeds a specified value, a case where a processing loop of steps S104A to S106B is executed a specified number of times, or the like. The specified number of times is set to, for example, 10 times, 100 times, 1000 times, or the like.

In step S107A, the CPU 40A, as the action determination unit 44, determines an action command that maximizes the reward and outputs the action command to the robot 10. For example, the action command may be the action command itself when the reward satisfies the specified condition, or the action command predicted from a history of a change in the reward corresponding to a change in the action command and capable of further maximizing the reward.

Third Embodiment

Next, a third embodiment of the disclosed technology will be described. Note that the same parts as those of the first embodiment are denoted by the same reference signs, and a detailed description thereof will be omitted.
(Robot Control Device)

Figure 11:
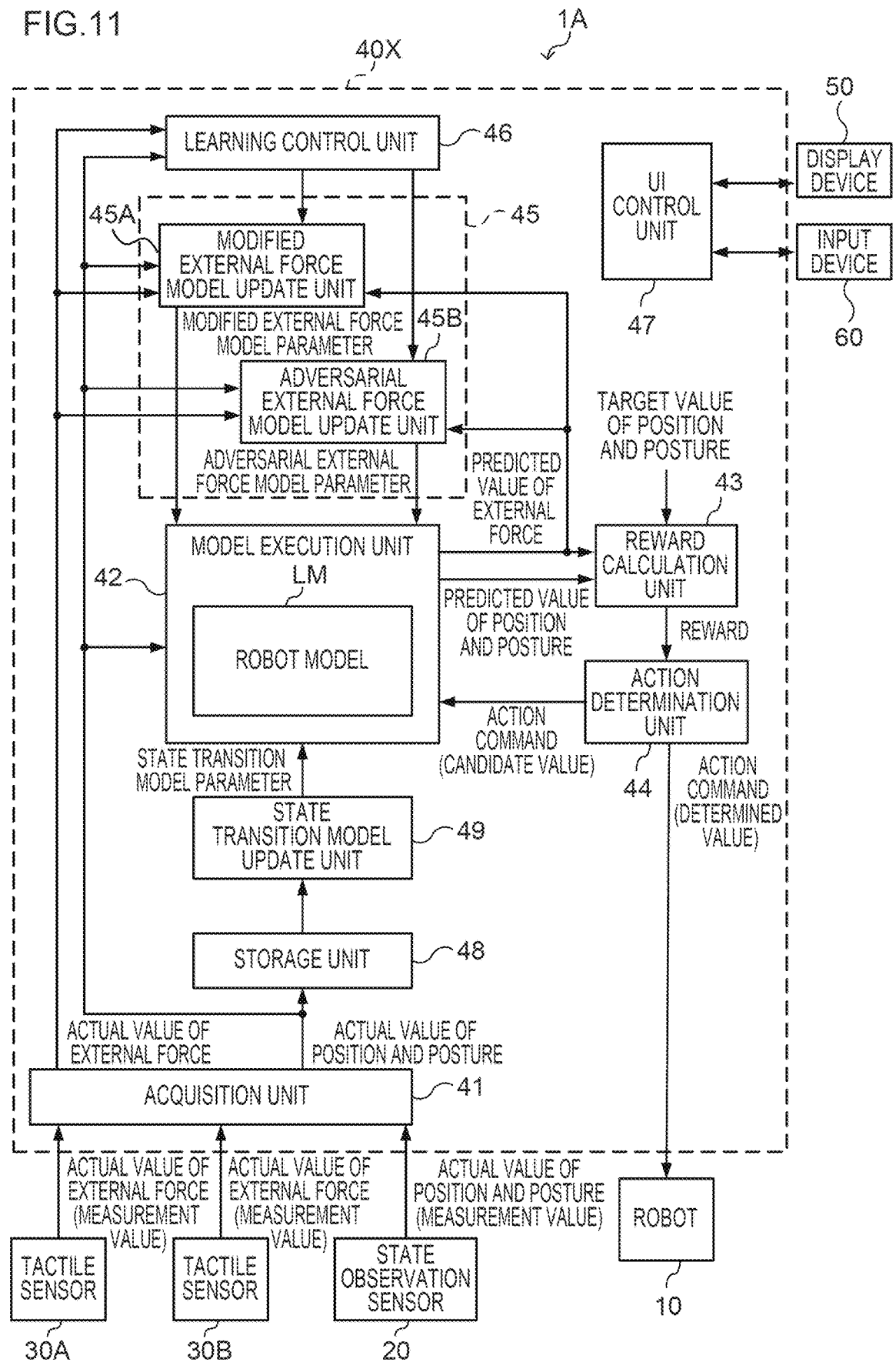
FIG. 11 is a configuration diagram of a robot system according to a third embodiment.

FIG. 11 is a functional configuration of a robot control device 40X according to the third embodiment. The robot control device 40X is different from the robot control device 40 illustrated in FIG. 1 in that a storage unit 48 and a state transition model update unit 49 are provided. Other configurations are the same as those of the robot control device 40, and thus the description thereof will be omitted.

The storage unit 48 stores the actual value of the position and the posture of the robot 10 acquired by the acquisition unit 41.

The state transition model update unit 49 updates the state transition model DM such that an error between the predicted value of the position and the posture calculated by the state transition model DM on the basis of the action command determined by the action determination unit 44 and the actual value of the position and the posture corresponding to the predicted value of the position and the posture becomes small.
(Learning Process of Robot Model)

FIG. 12 is a flowchart illustrating a flow of a machine learning process according to the third embodiment. The machine learning process of FIG. 12 is executed by the CPU 40A reading a machine learning program stored in the ROM 40B or the storage 40D and developing the machine learning program in the RAM 40C.

The learning process of FIG. 12 is different from the learning process of FIG. 9 in that the processing of steps S101A and S103A are added. Since the other steps are the same as those in the process of FIG. 9, the description thereof will be omitted.

In step S101A, the CPU 40A causes the storage unit 48 to store the actual value of the position and the posture of the robot 10 acquired in step S101 as the acquisition unit 41.

In step S103A, the CPU 40A updates the state transition model DM as the state transition model update unit 49. Specifically, first, for example, a set of an actual value xt of the position and the posture for 100 times t randomly selected from the values stored in the storage unit 48, a speed command value ut as the action command, and an actual value xt+t of the position and the posture for the time t+1 is acquired. Next, a new state transition model parameter obtained by correcting the previous state transition model parameter is determined. The correction of the state transition model parameter is performed with a target of minimizing an error between the predicted value of the position and the posture at the time t+1 calculated from the actual value of the position and the posture at the time t and the actual value of the position and the posture at the time t+1.

Then, the new state transition model parameter is set in the state transition model DM. The new state transition model parameter is stored in the state transition model update unit 49 to be used as the "previous model parameter" in the next control cycle.

As described above, in the present embodiment, the state transition model DM can be learned together with the modified external force model EM1 and the adversarial external force model EM2.

Experimental Example

Next, an experimental example of the disclosed technology will be described.

FIG. 13 illustrates a result of learning a robot model by performing a task of inserting a peg into a hole while applying a modified external force and an adversarial external force to the robot by simulation. In this simulation, the robot model was learned by applying the modified external force seven times and then applying the adversarial external force seven times.

Figure 13A:
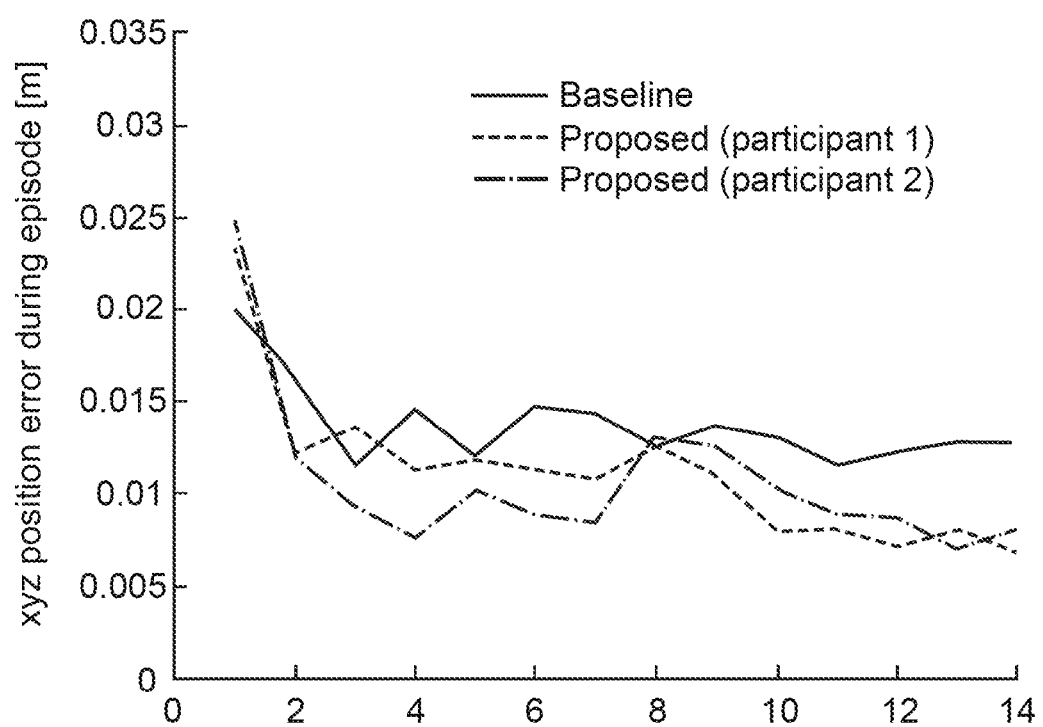
FIG. 13A is a graph illustrating a learning curve for a position error.
Figure 13B:
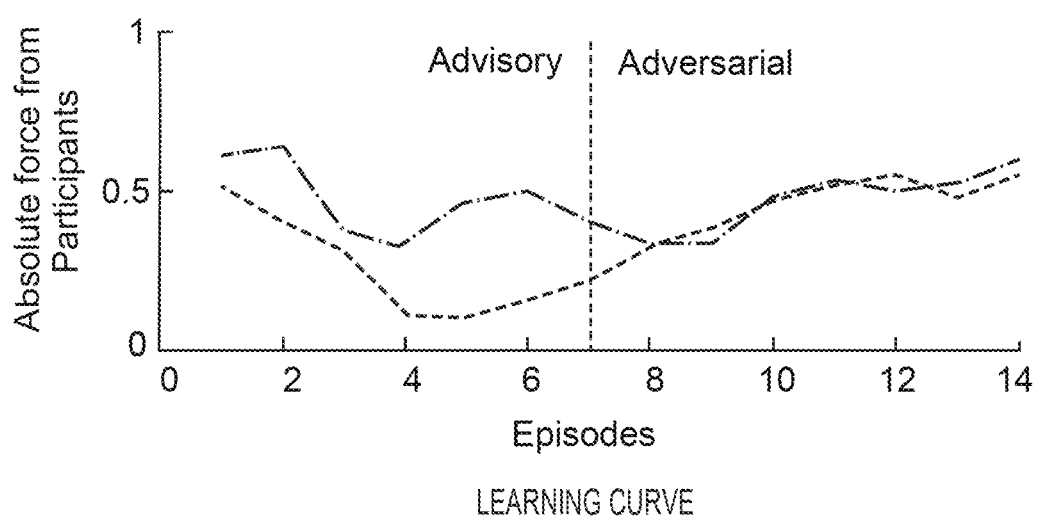
FIG. 13B is a graph illustrating a learning curve for an external force.

A horizontal axis in FIGS. 13A and 13B represents the number of times of application of the external force. A vertical axis in FIG. 13A represents an error in a position of the peg. A vertical axis in FIG. 13B represents a magnitude of the applied external force.

FIG. 13A illustrates a result (Baseline) of learning only the state transition model without applying the external force by the conventional method, a result (Proposed (participant 1)) of learning a robot model including the modified external force model and the adversarial external force model by the modified external force and the adversarial external force applied by a subject 1 by the proposed method, and a result (Proposed (participant 2)) of learning the robot model including the modified external force model and the adversarial external force model by the modified external force and the adversarial external force applied by a subject 2 different from the subject 1 by the proposed method. As illustrated in FIG. 13A, when a position error at the end of learning is compared between the conventional method and the proposed method (the subject 1 and the subject 2), it can be seen that the position error of the proposed method is smaller than that of the conventional method. Furthermore, as illustrated in FIG. 13B, it has been found that the method of applying the external force is different between the subjects 1 and 2, but the position error is small regardless of the subject.

Figure 14A:
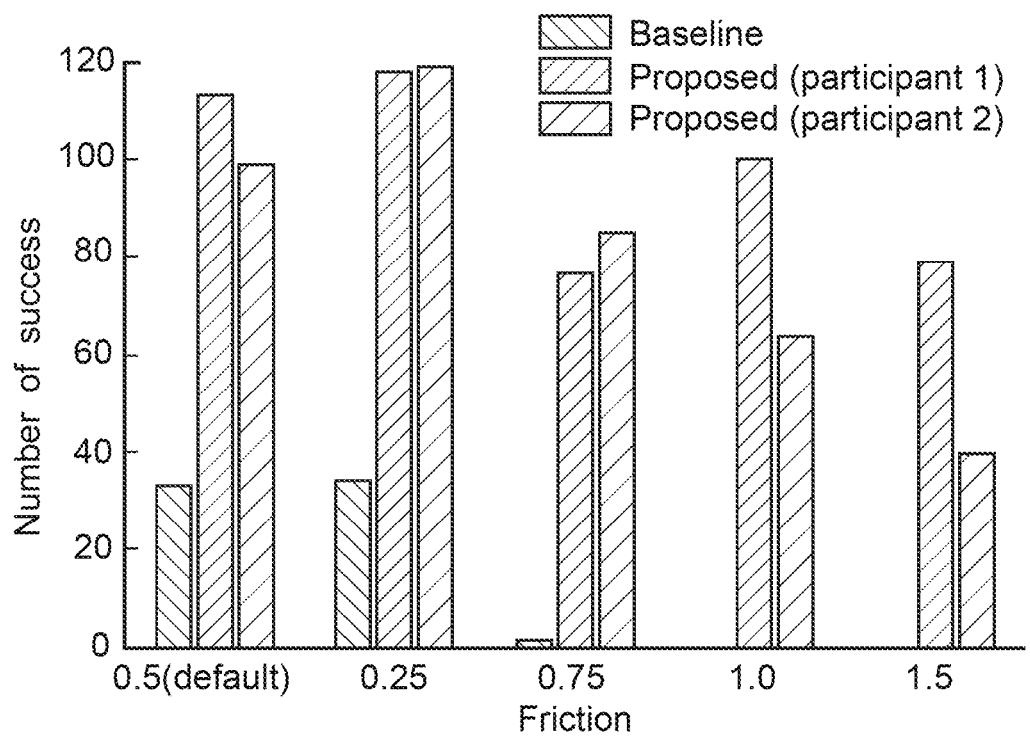
FIG. 14A is a graph illustrating the number of successes of a task in different frictions.
Figure 14B:
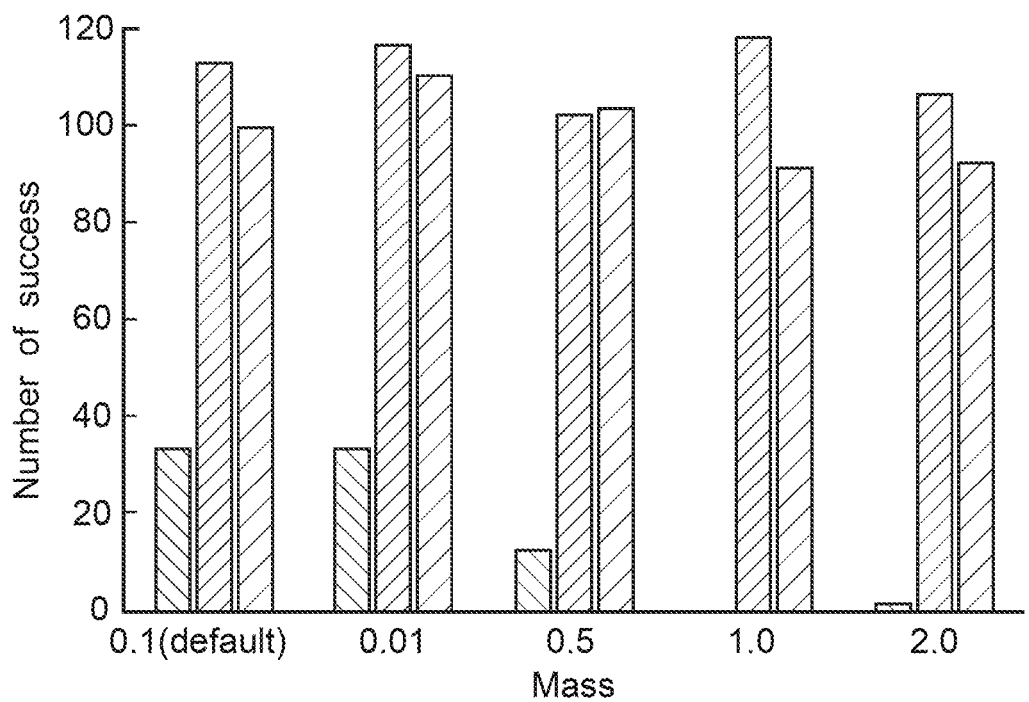
FIG. 14B is a graph illustrating the number of successes of a task in masses of different pegs.

Furthermore, FIG. 14A illustrates a simulation result of the number of times of successful insertion of the peg by changing a friction coefficient of a table provided with a hole. FIG. 14B illustrates a simulation result of the number of times of successful insertion of the peg by changing the mass of the peg. As illustrated in FIGS. 14A and B, it has been found that the number of times of successful insertion of the peg in the proposed method is larger than that in the conventional method even when the friction coefficient of the table and the mass of the peg are different.

Furthermore, FIG. 15 illustrates a result of performing a task of inserting the peg similar to the simulation in an actual machine using pegs of different materials. There are three types of peg materials: metal (default), plastic, and sponge. As illustrated in FIG. 15, it has been found that the number of times of successful insertion of the pegs in the proposed method is larger than that in the conventional method for the pegs made of any material.

As can be seen from the configuration and operation of the above embodiments and the above experimental example, the efficiency of the machine learning of the robot model can be enhanced by performing the machine learning by applying the modified external force. Furthermore, by applying an adversarial external force and performing machine learning, it is possible to enhance robustness against a frictional force and a change in mass in an object to be gripped. Furthermore, machine learning by applying an adversarial external force also has an effect of increasing learning efficiency.

Note that the above embodiments merely exemplarily describe the configuration example of the present disclosure. The disclosed technology is not limited to the specific forms described above, and various modifications can be made within the scope of the technical idea.

For example, in the above embodiments, the fitting work of the peg has been described as an example, but the work to be learned and controlled may be any work.

Furthermore, the robot model learning process and the robot control process executed by the CPU reading software (program) in each of the above embodiments may be executed by various processors other than the CPU. Examples of the processor in this case include a programmable logic device (PLD) in which a circuit configuration can be changed after manufacturing a field-programmable gate array (FPGA) or the like, a dedicated electric circuit that is a processor having a circuit configuration exclusively designed for executing specific processing such as an application specific integrated circuit (ASIC), and the like. Furthermore, the learning process and the control process may be executed by one of these various processors, or may be executed by a combination of two or more processors of the same type or different types (for example, a plurality of FPGAs, a combination of a CPU and an FPGA, and the like). Furthermore, more specifically, the hardware structure of these various processors is an electric circuit in which circuit elements such as semiconductor elements are combined.

Furthermore, in each of the above embodiments, the aspect in which the learning program of the robot model and the robot control program are stored (installed) in advance in the storage 40D or the ROM 40B has been described, but the disclosed technology is not limited thereto. The program may be provided in a form of being recorded in a recording medium such as a compact disk read only memory (CD-ROM), a digital versatile disk read only memory (DVD-ROM), or a universal serial bus (USB) memory. Furthermore, the program may be downloaded from an external device via a network.

With regard to the above embodiments, the following supplementary notes are further disclosed.

Supplement 1

A robot model learning device including:

an acquisition unit (41) that acquires an actual value of a position and a posture of a robot and an actual value of an external force applied to the robot;

a robot model (LM) including a state transition model (DM) that, based on the actual value of the position and the posture at a certain time and an action command that can be given to the robot, calculates a predicted value of the position and the posture of the robot at a next time, and an external force model (EM) that calculates a predicted value of an external force applied to the robot;

a model execution unit (42) that executes the robot model;

a reward calculation unit (43) that calculates a reward based on an error between the predicted value of the position and the posture and a target value of a position and a posture to be reached, and the predicted value of the external force;

an action determination unit (44) that generates and gives a plurality of candidates for the action command to the robot model for each control cycle, and based on a reward calculated by the reward calculation unit corresponding to each of the plurality of candidates for the action command, determines an action command that maximizes a reward; and an external force model update unit (45) that updates the external force model so as to reduce a difference between the predicted value of the external force calculated by the external force model based on the determined action command and the actual value of the external force corresponding to the predicted value of the external force.

Supplement 2

The robot model learning device according to Supplement 1, further including a state transition model update unit (49) that updates the state transition model so as to reduce an error between the predicted value of the position and the posture calculated by the state transition model based on the determined action command and the actual value of the position and the posture corresponding to the predicted value of the position and the posture.

Supplement 3

The robot model learning device according to Supplement 1 or 2, in which in a case where the external force is a modified external force that is an external force suppressing an enlargement of the error, the reward calculation unit calculates the reward by calculation in which a predicted value of the modified external force is a decrease factor of the reward.

Supplement 4

The robot model learning device according to Supplement 3, in which
the reward calculation unit calculates the reward by calculation in which a change width of a decrease amount of the reward based on the predicted value of the modified external force during task execution is smaller than a change width of a decrease amount of the reward based on the error.

Supplement 5

The robot model learning device according to Supplement 3 or 4, in which
the external force model includes a modified external force model (EM1) that outputs the predicted value of the modified external force in a case where the external force is the modified external force, and
the external force model update unit includes a modified external force model update unit (45A) that updates the modified external force model so as to reduce a difference between the predicted value of the modified external force calculated by the modified external force model based on the determined action command and an actual value of the modified external force in a case where the external force is the modified external force.

Supplement 6

The robot model learning device according to Supplement 1 or 2, in which
in a case where the external force is an adversarial external force that is an external force suppressing a reduction of the error, the reward calculation unit calculates the reward by calculation in which a predicted value of the adversarial external force is an increase factor of the reward.

Supplement 7

The robot model learning device according to Supplement 6, in which
the reward calculation unit calculates the reward by calculation in which a change width of an increase amount of the reward based on a predicted value of the adversarial external force during task execution is smaller than a change width of an increase amount of the reward based on the error.

Supplement 8

The robot model learning device according to Supplement 6 or 7, in which
the external force model includes an adversarial external force model (EM2) that outputs a predicted value of the adversarial external force in a case where the external force is the adversarial external force, and
the external force model update unit includes an adversarial external force model update unit (45B) that updates the adversarial external force model so as to reduce a difference between the predicted value of the adversarial external force calculated by the adversarial external force model based on the determined action command and an actual value of the adversarial external force in a case where the external force is the adversarial external force.

Supplement 9

The robot model learning device according to Supplement 1 or 2, in which
in a case where the external force is a modified external force suppressing an enlargement of the error, the reward calculation unit calculates the reward by calculation in which a predicted value of the modified external force is a decrease factor of the reward, and in a case where the external force is an adversarial external force that is an external force suppressing a reduction of the error, the reward calculation unit calculates the reward by calculation in which a predicted value of the adversarial external force is an increase factor of the reward.

Supplement 10

The robot model learning device according to Supplement 9, in which the reward calculation unit calculates the reward by calculation in which a change width of a decrease amount of the reward based on the predicted value of the modified external force during task execution is smaller than a change width of the reward based on the error, and a change width of an increase amount of the reward based on the predicted value of the adversarial external force during task execution is smaller than a change width of the reward based on the error.

Supplement 11

The robot model learning device according to Supplement 9 or 10, in which
the external force model includes a modified external force model (EM1) that outputs the predicted value of the modified external force in a case where the external force is the modified external force, and an adversarial external force model (EM2) that outputs the predicted value of the adversarial external force in a case where the external force is the adversarial external force, and
the external force model update unit includes a modified external force model update unit that updates the modified external force model so as to reduce a difference between the predicted value of the modified external force calculated by the modified external force model based on the determined action command and the actual value of the external force in a case where the external force is the modified external force, and an adversarial external force model update unit (45B) that updates the adversarial external force model so as to reduce a difference between the predicted value of the adversarial external force calculated by the adversarial external force model based on the determined action command and the actual value of the external force in a case where the external force is the adversarial external force.

Supplement 12

The robot model learning device according to Supplement 11, in which
the robot model includes an integrated external force model (IM) including the modified external force model and the adversarial external force model,
the modified external force model and the adversarial external force model are neural networks,
at least one of one or a plurality of intermediate layers and an output layer of the adversarial external force model integrates outputs of layers preceding a corresponding layer of the modified external force model by a progressive neural network method,
the integrated external force model outputs an output of the adversarial external force model as the predicted value of the external force,
the integrated external force model outputs identification information indicating whether the predicted value of the external force to be output is the predicted value of the modified external force or the predicted value of the adversarial external force, and
the reward calculation unit calculates the reward by calculation in which the predicted value of the external force is a decrease factor of the reward in a case where the identification information indicates the predicted value of the modified external force, and calculates the reward by calculation in which the predicted value of the external force is an increase factor of the reward in a case where the identification information indicates the predicted value of the adversarial external force.

Supplement 13

The robot model learning device according to Supplement 11 or 12, further including:
a reception unit that receives designation of whether the external force is the modified external force or the adversarial external force; and
a learning control unit that validates an operation of the modified external force model update unit in a case where the designation is the modified external force, and validates an operation of the adversarial external force model update unit in a case where the designation is the adversarial external force.

Supplement 14

The robot model learning device according to Supplement 11 or 12, further including
a learning control unit (46) that makes a discrimination of whether the external force is the modified external force or the adversarial external force based on the actual value of the position and the posture and the actual value of the external force, validates an operation of the modified external force model update unit in a case where a result of the discrimination is the modified external force, and validates an operation of the adversarial external force model update unit in a case where a result of the discrimination is the adversarial external force.

Supplement 15

A robot model machine learning method including:
preparing a robot model (LM) including a state transition model (DM) that, based on an actual value of a position and a posture of a robot at a certain time and an action command that can be given to the robot, calculates a predicted value of the position and the posture of the robot at a next time, and an external force model (EM) that calculates a predicted value of an external force applied to the robot;
acquiring the actual value of the position and the posture and an actual value of the external force applied to the robot for each control cycle;
generating and giving a plurality of candidates for the action command to the robot model for each control cycle, and based on a plurality of rewards calculated corresponding to the plurality of candidates for the action command based on a plurality of errors between a plurality of predicted values of the position and the posture calculated by the state transition model corresponding to the plurality of candidates for the action command and a target value of a position and a posture to be reached, and a plurality of the predicted values of the external force calculated by the external force model corresponding to the plurality of candidates for the action command, determining an action command that maximizes the rewards; and
updating the external force model so as to reduce a difference between the predicted values of the external force calculated by the external force model based on the determined action command and the actual values of the external force corresponding to the predicted values of the external force.

Supplement 16

The robot model machine learning method according to Supplement 15, further including
updating the state transition model so as to reduce errors between the predicted values of the position and the posture calculated by the state transition model based on the determined action command and the actual values of the position and the posture corresponding to the predicted values of the position and the posture.

Supplement 17

The robot model machine learning method according to Supplement 15 or 16, in which
in a case where the external force is a modified external force that is an external force suppressing an enlargement of the errors, the rewards are calculated by calculation in which the predicted values of the modified external force are a decrease factor of the rewards.

Supplement 18

The robot model machine learning method according to Supplement 17, in which
the rewards are calculated by calculation in which a change width of a decrease amount of the rewards based on the predicted values of the modified external force during task execution is smaller than a change width of the rewards based on the errors.

Supplement 19

The robot model machine learning method according to Supplement 17 or 18, in which
the external force model includes a modified external force model (EM1) that outputs the predicted values of the modified external force in a case where the external force is the modified external force, and
the modified external force model is updated so as to reduce a difference between the predicted values of the modified external force calculated by the modified external force model based on the determined action command and the actual values of the external force in a case where the external force is the modified external force.

Supplement 20

The robot model machine learning method according to Supplement 19, in which
the modified external force is applied to the robot in a case where the errors are enlarging.

Supplement 21

The robot model machine learning method according to Supplement 15 or 16, in which
in a case where the external force is an adversarial external force that is an external force suppressing a reduction of the errors, the rewards are calculated by calculation in which the predicted values of the adversarial external force are an increase factor of the rewards.

Supplement 22

The robot model machine learning method according to Supplement 21, in which
the rewards are calculated by calculation in which a change width of an increase amount of the rewards based on the predicted values of the adversarial external force during task execution is smaller than a change width of the rewards based on the errors.

Supplement 23

The robot model machine learning method according to Supplement 21 or 22, in which
the external force model includes an adversarial external force model (EM2) that outputs the predicted values of the adversarial external force in a case where the external force is the adversarial external force, and
the adversarial external force model is updated so as to reduce a difference between the predicted values of the adversarial external force calculated by the adversarial external force model based on the determined action command and the actual values of the external force in a case where the external force is the adversarial external force.

Supplement 24

The robot model machine learning method according to Supplement 23, in which
the adversarial external force is applied to the robot in a case where the errors are reducing.

Supplement 25

The robot model machine learning method according to Supplement 15 or 16, in which
in a case where the external force is a modified external force suppressing an enlargement of the errors, the rewards are calculated by calculation in which the predicted values of the modified external force are a decrease factor of the rewards, and in a case where the external force is an adversarial external force that is an external force suppressing a reduction of the errors, the rewards are calculated by calculation in which the predicted values of the adversarial external force are an increase factor of the rewards.

Supplement 26

The robot model machine learning method according to Supplement 25, in which
the rewards are calculated by calculation in which a change width of a decrease amount of the rewards based on the predicted values of the modified external force during task execution is smaller than a change width of the rewards based on the errors, and a change width of an increase amount of the rewards based on the predicted values of the adversarial external force during task execution is smaller than a change width of the rewards based on the errors.

Supplement 27

The robot model machine learning method according to Supplement 25 or 26, in which the external force model includes a modified external force model (EM1) that outputs the predicted values of the modified external force in a case where the external force is the modified external force, and an adversarial external force model (EM2) that outputs the predicted values of the adversarial external force in a case where the external force is the adversarial external force, and the modified external force model is updated so as to reduce a difference between the predicted values of the modified external force calculated by the modified external force model based on the determined action command and the actual values of the external force in a case where the external force is the modified external force, and the adversarial external force model is updated so as to reduce a difference between the predicted values of the adversarial external force calculated by the adversarial external force model based on the determined action command and the actual values of the external force in a case where the external force is the adversarial external force.

Supplement 28

The robot model machine learning method according to Supplement 27, in which
the modified external force is applied to the robot in a case where the errors are enlarging, and the adversarial external force is applied to the robot in a case where the errors are reducing.

Supplement 29

A robot model machine learning program for machine learning a robot model (LM) including a state transition model (DM) that, based on an actual value of a position and a posture of a robot at a certain time and an action command that can be given to the robot, calculates a predicted value of the position and the posture of the robot at a next time, and an external force model (EM) that calculates a predicted value of an external force applied to the robot, the robot model machine learning program causing a computer to perform processing of:
 acquiring the actual value of the position and the posture and an actual value of the external force applied to the robot for each control cycle;
 generating and giving a plurality of candidates for the action command to the robot model for each control cycle, and based on a plurality of rewards calculated corresponding to the plurality of candidates for the action command based on a plurality of errors between a plurality of predicted values of the position and the posture calculated by the state transition model corresponding to the plurality of candidates for the action command and a target value of a position and a posture to be reached, and a plurality of the predicted values of the external force calculated by the external force model corresponding to the plurality of candidates for the action command, determining an action command that maximizes the rewards; and
 updating the external force model so as to reduce a difference between the predicted values of the external force calculated by the external force model based on the determined action command and the actual values of the external force corresponding to the predicted values of the external force.

Supplement 30

A robot control device including:
 a model execution unit (42) that executes a robot model (LM) including a state transition model (DM) that, based on an actual value of a position and a posture of a robot at a certain time and an action command that can be given to the robot, calculates a predicted value of the position and the posture of the robot at a next time, and an external force model (EM) that calculates a predicted value of an external force applied to the robot;
 an acquisition unit (41) that acquires the actual value of the position and the posture of the robot and an actual value of an external force applied to the robot;
 a reward calculation unit (43) that calculates a reward based on an error between the predicted value of the position and the posture calculated by the robot model and a target value of a position and a posture to be reached, and the predicted value of the external force calculated by the robot model; and
 an action determination unit (44) that generates and gives a plurality of candidates for the action command to the robot model for each control cycle, and based on a reward calculated by the reward calculation unit corresponding to each of the plurality of candidates for the action command, determines an action command that maximizes a reward.

Supplement 31

A robot control method including:
 preparing a robot model (LM) including a state transition model (DM) that, based on an actual value of a position and a posture of a robot at a certain time and an action command that can be given to the robot, calculates a predicted value of the position and the posture of the robot at a next time, and an external force model (EM) that calculates a predicted value of an external force applied to the robot;
 acquiring the actual value of the position and the posture and an actual value of the external force applied to the robot for each control cycle;
 generating and giving a plurality of candidates for the action command to the robot model for each control cycle, and based on a plurality of rewards calculated corresponding to the plurality of candidates for the action command based on a plurality of errors between a plurality of predicted values of the position and the posture calculated by the state transition model corresponding to the plurality of candidates for the action command and a target value of a position and a posture to be reached, and a plurality of the predicted values of the external force calculated by the external force model corresponding to the plurality of candidates for the action command, determining an action command that maximizes the rewards; and
 controlling the robot based on the determined action command.

Supplement 32

A robot control program for controlling a robot using a robot model (LM) including a state transition model (DM) that, based on an actual value of a position and a posture of a robot at a certain time and an action command that can be given to the robot, calculates a predicted value of the position and the posture of the robot at a next time, and an external force model (EM) that calculates a predicted value of an external force applied to the robot, the robot control program causing a computer to perform processing of:
  acquiring the actual value of the position and the posture and an actual value of the external force applied to the robot for each control cycle;
  generating and giving a plurality of candidates for the action command to the robot model for each control cycle, and based on a plurality of rewards calculated corresponding to the plurality of candidates for the action command based on a plurality of errors between a plurality of predicted values of the position and the posture calculated by the state transition model corresponding to the plurality of candidates for the action command and a target value of a position and a posture to be reached, and a plurality of the predicted values of the external force calculated by the external force model corresponding to the plurality of candidates for the action command, determining an action command that maximizes the rewards; and
  controlling the robot based on the determined action command.

Note that the disclosure of Japanese Patent Application No. 2021-20049 is incorporated herein by reference in its entirety. Furthermore, all documents, patent applications, and technical standards described in this specification are incorporated herein by reference to the same extent as if each document, patent application, and technical standard were specifically and individually described to be incorporated by reference.

The invention claimed is:

1. A robot model learning device comprising:
  a robot model including a state transition model that, based on the actual value of the position and the posture at a certain time and an action command that can be given to the robot, calculates, a predicted value of a position and a posture of the robot at a next time, and an external force model that calculates a predicted value of an external force applied to the robot;
  a processor configured to:
  acquire an actual value of a position and a posture of a robot and an actual value of an external force applied to the robot;
  execute the robot model;
  calculate a reward based on an error between the predicted value of the position and the posture and a target value of a position and a posture to be attained, and the predicted value of the external force;
  generate and provide a plurality of candidates for the action command to the robot model for each control cycle, and based on a reward corresponding to each of the plurality of candidates for the action command, determine an action command that maximizes a reward; and
  update the external force model so as to reduce a difference between the predicted value of the external force calculated by the external force model based on the determined action command, and an actual value of the external force corresponding to the predicted value of the external force, wherein:
  in a case in which the external force is a modified external force that is an external force suppressing an enlargement of the error, the processor is configured to calculate the reward by calculation in which a predicted value of the modified external force is a decrease factor of the reward.

2. The robot model learning device according to claim 1, wherein the processor is further configured to update the state transition model so as to reduce an error between the predicted value of the position and the posture calculated by the state transition model based on the determined action command, and an actual value of the position and the posture corresponding to the predicted value of the position and the posture.

3. A robot model learning device comprising:
  a robot model including a state transition model that, based on the actual value of the position and the posture at a certain time and an action command that can be given to the robot, calculates, a predicted value of a position and a posture of the robot at a next time, and an external force model that calculates a predicted value of an external force applied to the robot;
  a processor configured to:
  acquire an actual value of a position and a posture of a robot and an actual value of an external force applied to the robot;
  execute the robot model;
  calculate a reward based on an error between the predicted value of the position and the posture and a target value of a position and a posture to be attained, and the predicted value of the external force;
  generate and provide a plurality of candidates for the action command to the robot model for each control cycle, and based on a reward corresponding to each of the plurality of candidates for the action command, determine an action command that maximizes a reward; and
  update the external force model so as to reduce a difference between the predicted value of the external force calculated by the external force model based on the determined action command, and an actual value of the external force corresponding to the predicted value of the external force, wherein:
  in a case in which the external force is an adversarial external force that is an external force suppressing a reduction of the error, the processor is configured to calculate the reward by calculation in which a predicted value of the adversarial external force is an increase factor of the reward.

4. A robot model learning device comprising:
  a robot model including a state transition model that, based on the actual value of the position and the posture at a certain time and an action command that can be given to the robot, calculates, a predicted value of a position and a posture of the robot at a next time, and an external force model that calculates a predicted value of an external force applied to the robot;
  a processor configured to:
  acquire an actual value of a position and a posture of a robot and an actual value of an external force applied to the robot;
  execute the robot model;
  calculate a reward based on an error between the predicted value of the position and the posture and a target value of a position and a posture to be attained, and the predicted value of the external force;
  generate and provide a plurality of candidates for the action command to the robot model for each control cycle, and based on a reward corresponding to each of the plurality of candidates for the action command, determine an action command that maximizes a reward; and update the external force model so as to reduce a difference between the predicted value of the external force calculated by the external force model based on the determined action command, and an actual value of the external force corresponding to the predicted value of the external force, wherein:

in a case in which the external force is a modified external force suppressing an enlargement of the error, the processor is configured to calculate the reward by calculation in which a predicted value of the modified external force is a decrease factor of the reward, and in a case in which the external force is an adversarial external force that is an external force suppressing a reduction of the error, the processor is configured to calculate the reward by calculation in which a predicted value of the adversarial external force is an increase factor of the reward.

5. The robot model learning device according to claim 4, wherein:

the processor is configured to calculate the reward by a calculation in which an amount of change of a decrease of the reward based on the predicted value of the modified external force during task execution is smaller than an amount of change of the reward based on the error, and an amount of change of an increase of the reward based on the predicted value of the adversarial external force during task execution is smaller than the amount of change of the reward based on the error.

6. The robot model learning device according to claim 4, wherein:

the external force model includes a modified external force model that outputs the predicted value of the modified external force in a case in which the external force is the modified external force, and an adversarial external force model that outputs the predicted value of the adversarial external force in a case in which the external force is the adversarial external force, and the processor is configured to update the modified external force model so as to reduce a difference between the predicted value of the modified external force calculated by the modified external force model based on the determined action command, and the actual value of the external force, in a case in which the external force is the modified external force, and the processor is configured to update the adversarial external force model so as to reduce a difference between the predicted value of the adversarial external force calculated by the adversarial external force model based on the determined action command, and the actual value of the external force, in a case in which the external force is the adversarial external force.

7. The robot model learning device according to claim 6, wherein:

the robot model includes an integrated external force model including the modified external force model and the adversarial external force model, the modified external force model and the adversarial external force model are neural networks, at least one of one or a plurality of intermediate layers or an output layer, of the adversarial external force model, integrates outputs of layers preceding a corresponding layer of the modified external force model by a progressive neural network method, the integrated external force model outputs an output of the adversarial external force model as the predicted value of the external force, the integrated external force model outputs identification information indicating whether the predicted value of the external force to be output is the predicted value of the modified external force or the predicted value of the adversarial external force, and the processor is configured to calculate the reward by calculation in which the predicted value of the external force is a decrease factor of the reward in a case in which the identification information indicates the predicted value of the modified external force, and calculates the reward by calculation in which the predicted value of the external force is an increase factor of the reward in a case in which the identification information indicates the predicted value of the adversarial external force.

8. The robot model learning device according to claim 6, wherein the processor is configured to:

receive designation of whether the external force is the modified external force or the adversarial external force; and validate update operation for updating the modified external force model in a case in which the designation is the modified external force, and validate update operation for updating the adversarial external force model in a case in which the designation is the adversarial external force.

9. The robot model learning device according to claim 6, wherein the processor is configured to:

make a discrimination of whether the external force is the modified external force or the adversarial external force based on the actual value of the position and the posture and the actual value of the external force, validate update operation for updating the modified external force model in a case in which a result of the discrimination is the modified external force, and validates validate update operation for updating the adversarial external force model in a case in which the result of the discrimination is the adversarial external force.

10. A robot model machine learning method comprising:

preparing a robot model including a state transition model that, based on an actual value of a position and a posture of a robot at a certain time and an action command that can be given to the robot, calculates a predicted value of a position and a posture of the robot at a next time, and an external force model that calculates a predicted value of an external force applied to the robot;

acquiring the actual value of the position and the posture and an actual value of the external force applied to the robot, for each control cycle;

generating and giving a plurality of candidates for the action command to the robot model for each control cycle, and based on a plurality of rewards calculated corresponding to the plurality of candidates for the action command, which are based on a plurality of errors between a plurality of predicted values of the position and the posture calculated by the state transition model corresponding to the plurality of candidates for the action command and a target value of a position and a posture to be attained, and a plurality of the predicted values of the external force calculated by the external force model corresponding to the plurality of candidates for the action command, determining an action command that maximizes the rewards; and updating the external force model so as to reduce a difference between the predicted values of the external force calculated by the external force model based on the determined action command, and the actual values of the external force corresponding to the predicted values of the external force, wherein:

in a case in which the external force is a modified external force that is an external force suppressing an enlargement of the errors, the rewards are calculated by calculation in which predicted values of the modified external force are a decrease factor of the rewards.

11. The robot model machine learning method according to claim 10, further comprising:
updating the state transition model so as to reduce errors between the predicted values of the position and the posture calculated by the state transition model based on the determined action command, and the actual values of the position and the posture corresponding to the predicted values of the position and the posture.

12. A robot model machine learning method comprising:
preparing a robot model including a state transition model that, based on an actual value of a position and a posture of a robot at a certain time and an action command that can be given to the robot, calculates a predicted value of a position and a posture of the robot at a next time, and an external force model that calculates a predicted value of an external force applied to the robot;
acquiring the actual value of the position and the posture and an actual value of the external force applied to the robot, for each control cycle;
generating and giving a plurality of candidates for the action command to the robot model for each control cycle, and based on a plurality of rewards calculated corresponding to the plurality of candidates for the action command, which are based on a plurality of errors between a plurality of predicted values of the position and the posture calculated by the state transition model corresponding to the plurality of candidates for the action command and a target value of a position and a posture to be attained, and a plurality of the predicted values of the external force calculated by the external force model corresponding to the plurality of candidates for the action command, determining an action command that maximizes the rewards; and
updating the external force model so as to reduce a difference between the predicted values of the external force calculated by the external force model based on the determined action command, and the actual values of the external force corresponding to the predicted values of the external force, wherein:

in a case in which the external force is an adversarial external force that is an external force suppressing a reduction of the errors, the rewards are calculated by calculation in which predicted values of the adversarial external force are an increase factor of the rewards.

13. A robot model machine learning method comprising:
preparing a robot model including a state transition model that, based on an actual value of a position and a posture of a robot at a certain time and an action command that can be given to the robot, calculates a predicted value of a position and a posture of the robot at a next time, and an external force model that calculates a predicted value of an external force applied to the robot;
acquiring the actual value of the position and the posture and an actual value of the external force applied to the robot, for each control cycle;
generating and giving a plurality of candidates for the action command to the robot model for each control cycle, and based on a plurality of rewards calculated corresponding to the plurality of candidates for the action command, which are based on a plurality of errors between a plurality of predicted values of the position and the posture calculated by the state transition model corresponding to the plurality of candidates for the action command and a target value of a position and a posture to be attained, and a plurality of the predicted values of the external force calculated by the external force model corresponding to the plurality of candidates for the action command, determining an action command that maximizes the rewards; and
updating the external force model so as to reduce a difference between the predicted values of the external force calculated by the external force model based on the determined action command, and the actual values of the external force corresponding to the predicted values of the external force, wherein:

in a case in which the external force is a modified external force suppressing an enlargement of the errors, the rewards are calculated by calculation in which predicted values of the modified external force are a decrease factor of the rewards, and in a case in which the external force is an adversarial external force that is an external force suppressing a reduction of the errors, the rewards are calculated by calculation in which predicted values of the adversarial external force are an increase factor of the rewards.

14. The robot model machine learning method according to claim 13, wherein:
the external force model includes a modified external force model that outputs the predicted values of the modified external force in a case in which the external force is the modified external force, and an adversarial external force model that outputs the predicted values of the adversarial external force in a case in which the external force is the adversarial external force, and
the modified external force model is updated so as to reduce a difference between the predicted values of the modified external force calculated by the modified external force model based on the determined action command, and the actual values of the external force, in a case in which the external force is the modified external force, and the adversarial external force model is updated so as to reduce a difference between the predicted values of the adversarial external force calculated by the adversarial external force model based on the determined action command, and the actual values of the external force, in a case in which the external force is the adversarial external force.

15. The robot model machine learning method according to claim 14, wherein:
the modified external force is applied to the robot in a case in which the errors are enlarging, and the adversarial external force is applied to the robot in a case in which the errors are reducing.

16. A robot control device comprising:
a processor configured to:
execute a robot model including a state transition model that, based on an actual value of a position and a posture of a robot at a certain time and an action command that can be given to the robot, calculates a predicted value of a position and a posture of the robot at a next time, and an external force model that calculates a predicted value of an external force applied to the robot;

acquire the actual value of the position and the posture of the robot and an actual value of an external force applied to the robot;
calculate a reward based on an error between the predicted value of the position and the posture calculated by the robot model and a target value of a position and a posture to be attained, and the predicted value of the external force calculated by the robot model; and
generate and give a plurality of candidates for the action command to the robot model for each control cycle, and based on a reward corresponding to each of the plurality of candidates for the action command, determine an action command that maximizes a reward, wherein:
in a case in which the external force is a modified external force that is an external force suppressing an enlargement of the error, the processor is configured to calculate the reward by calculation in which a predicted value of the modified external force is a decrease factor of the reward.

17. A robot control device comprising:
a processor configured to:
execute a robot model including a state transition model that, based on an actual value of a position and a posture of a robot at a certain time and an action command that can be given to the robot, calculates a predicted value of a position and a posture of the robot at a next time, and an external force model that calculates a predicted value of an external force applied to the robot;
acquire the actual value of the position and the posture of the robot and an actual value of an external force applied to the robot;
calculate a reward based on an error between the predicted value of the position and the posture calculated by the robot model and a target value of a position and a posture to be attained, and the predicted value of the external force calculated by the robot model; and
generate and give a plurality of candidates for the action command to the robot model for each control cycle, and based on a reward corresponding to each of the plurality of candidates for the action command, determine an action command that maximizes a reward, wherein:
in a case in which the external force is an adversarial external force that is an external force suppressing a reduction of the error, the processor is configured to calculate the reward by calculation in which a predicted value of the adversarial external force is an increase factor of the reward.

18. A robot control device comprising:
a processor configured to:
execute a robot model including a state transition model that, based on an actual value of a position and a posture of a robot at a certain time and an action command that can be given to the robot, calculates a predicted value of a position and a posture of the robot at a next time, and an external force model that calculates a predicted value of an external force applied to the robot;
acquire the actual value of the position and the posture of the robot and an actual value of an external force applied to the robot;
calculate a reward based on an error between the predicted value of the position and the posture calculated by the robot model and a target value of a position and a posture to be attained, and the predicted value of the external force calculated by the robot model; and
generate and give a plurality of candidates for the action command to the robot model for each control cycle, and based on a reward corresponding to each of the plurality of candidates for the action command, determine an action command that maximizes a reward, wherein:
in a case in which the external force is a modified external force suppressing an enlargement of the error, the processor is configured to calculate the reward by calculation in which a predicted value of the modified external force is a decrease factor of the reward, and in a case in which the external force is an adversarial external force that is an external force suppressing a reduction of the error, the processor is configured to calculate the reward by calculation in which a predicted value of the adversarial external force is an increase factor of the reward.

* * * * *